(12) United States Patent
Hotelling

(10) Patent No.: US 9,405,421 B2
(45) Date of Patent: Aug. 2, 2016

(54) MUTUAL CAPACITANCE TOUCH SENSING DEVICE

(71) Applicant: Apple Inc., Cupertino, CA (US)

(72) Inventor: Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/678,597

(22) Filed: Apr. 3, 2015

(65) Prior Publication Data

US 2015/0212627 A1    Jul. 30, 2015

Related U.S. Application Data

(63) Continuation of application No. 14/293,843, filed on Jun. 2, 2014, now abandoned, which is a continuation of application No. 12/498,119, filed on Jul. 6, 2009, now Pat. No. 8,743,060, which is a continuation-in-part of application No. 11/482,286, filed on Jul. 6, 2006.

(51) Int. Cl.
*G06F 3/044* (2006.01)
*G06F 3/0362* (2013.01)
*G06F 3/041* (2006.01)

(52) U.S. Cl.
CPC .............. *G06F 3/044* (2013.01); *G06F 3/0362* (2013.01); *G06F 3/0414* (2013.01); *G06F 2203/04104* (2013.01); *G06F 2203/04106* (2013.01)

(58) Field of Classification Search
CPC ....................................................... G06F 3/044
USPC ........................................................ 345/173
See application file for complete search history.

(56) References Cited

U.S. PATENT DOCUMENTS

| | | | |
|---|---|---|---|
| 1,061,578 A | 5/1913 | Wischhusen et al. |
| 2,063,276 A | 12/1936 | Thomas |
| 2,798,907 A | 7/1957 | Schneider |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

"About Quicktip®" www.logicad3d.com/docs/qt.html, downloaded Apr. 8, 2002.

(Continued)

*Primary Examiner* — Viet Pham
(74) *Attorney, Agent, or Firm* — Morrison & Foerster LLP

(57) ABSTRACT

A mutual capacitive touch sensing device is disclosed. The device can include nodes for sensing a touch at the device and for sensing a force applied to the device. Some nodes can perform both touch and force sensing; while other nodes can perform touch sensing. The device can include distinct individual drive lines for driving the nodes and separate distinct individual sense lines for transmitting touch or force signals from the nodes. The nodes can form groups, where the nodes in each group can be coupled to the same drive line and to different sense lines and where each node in a group can be coupled to a node in a different group by the same sense line. Each node can be set up with a different combination of drive and sense lines coupled thereto. An example device can be a click wheel.

15 Claims, 18 Drawing Sheets

(56) References Cited

U.S. PATENT DOCUMENTS

| | | |
|---|---|---|
| 2,903,229 A | 9/1959 | Landge |
| 2,945,111 A | 7/1960 | McCormick |
| 3,005,055 A | 10/1961 | Mattke |
| 3,965,399 A | 6/1976 | Walker |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |

(56) References Cited

U.S. PATENT DOCUMENTS

| | | |
|---|---|---|
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerpheide |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |

(56) References Cited

U.S. PATENT DOCUMENTS

| | | |
|---|---|---|
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0104957 A1* | 8/2002 | Liess et al. .................... 250/221 |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0222660 A1 | 12/2003 | Morimoto |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender et al. |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0204309 A1 | 9/2005 | Szeto |
| 2005/0237308 A1 | 10/2005 | Autio et al. |
| 2006/0007171 A1 | 1/2006 | Burdi et al. |
| 2006/0026521 A1 | 2/2006 | Hotelling et al. |
| 2006/0032680 A1 | 2/2006 | Elias et al. |
| 2006/0038791 A1 | 2/2006 | Mackey |
| 2006/0087829 A1 | 4/2006 | Manico et al. |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |

(56) References Cited

U.S. PATENT DOCUMENTS

| | | | |
|---|---|---|---|
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling |
| 2008/0006454 A1 | 1/2008 | Hotelling |
| 2008/0007533 A1 | 1/2008 | Hotelling |
| 2008/0007539 A1 | 1/2008 | Hotelling |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest et al. |
| 2008/0088582 A1 | 4/2008 | Prest et al. |
| 2008/0088596 A1 | 4/2008 | Prest et al. |
| 2008/0088597 A1 | 4/2008 | Prest et al. |
| 2008/0088600 A1 | 4/2008 | Prest et al. |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest et al. |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2014/0267163 A1 | 9/2014 | Hotelling |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 100 22 537 | 11/2000 |
| DE | 20019074 | 2/2001 |
| DE | 10 2004 043 663 | 4/2006 |
| EP | 0 178 157 | 4/1986 |
| EP | 0 419 145 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 | 1/1997 |
| EP | 0 880 091 | 11/1998 |
| EP | 1 026 713 | 8/2000 |
| EP | 1 081 922 | 3/2001 |
| EP | 1098241 | 5/2001 |
| EP | 1 133 057 | 9/2001 |
| EP | 1 162 826 | 12/2001 |
| EP | 1 168 396 | 1/2002 |
| EP | 1 205 836 | 5/2002 |
| EP | 1 244 053 | 9/2002 |
| EP | 1 251 455 | 10/2002 |
| EP | 1 263 193 | 12/2002 |
| EP | 1 347 481 | 9/2003 |
| EP | 1 376 326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 | 6/2005 |
| EP | 1 589 407 | 10/2005 |
| EP | 1 784 058 | 5/2007 |
| EP | 1 841 188 | 10/2007 |
| EP | 1 850 218 | 10/2007 |
| EP | 1 876 711 | 1/2008 |
| FR | 2 686 440 | 7/1993 |
| GB | 2 015 167 | 9/1979 |
| GB | 2 072 389 | 9/1981 |
| GB | 2 315 186 | 1/1998 |
| GB | 2 333 215 | 7/1999 |
| GB | 2 391 060 | 1/2004 |
| GB | 2 402 105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 3-57617 | 6/1991 |
| JP | 3-192418 | 8/1991 |
| JP | 4-32920 | 2/1992 |
| JP | 4-205408 | 7/1992 |
| JP | 5-41135 | 2/1993 |
| JP | 5-80938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-84428 | 3/1994 |
| JP | 6-89636 | 3/1994 |
| JP | 6-96639 | 4/1994 |
| JP | 6-111685 | 4/1994 |
| JP | 6-111695 | 4/1994 |
| JP | 6-139879 | 5/1994 |
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 7-201256 | 8/1995 |

(56) References Cited

FOREIGN PATENT DOCUMENTS

| | | |
|---|---|---|
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-16292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-44289 | 2/1997 |
| JP | 9-69023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-74429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 1999-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3 085 481 | 2/2002 |
| JP | 2002-215311 | 8/2002 |
| JP | 2003-15796 | 1/2003 |
| JP | 2003-60754 | 2/2003 |
| JP | 2003-99198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-4453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-08579 | 2/2000 |
| KR | 2001-0052016 | 6/2001 |
| KR | 2001-0108361 | 12/2001 |
| KR | 2002-0065059 | 8/2002 |
| KR | 10-2006-0021678 | 3/2006 |
| TW | 431607 | 4/2001 |
| TW | 470193 | 12/2001 |
| TW | 547716 | 8/2003 |
| TW | I220491 | 8/2004 |
| WO | WO-94/17494 | 8/1994 |
| WO | WO-95/00897 | 1/1995 |
| WO | WO-96/27968 | 9/1996 |
| WO | WO-98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/025960 | 3/2003 |
| WO | WO-03/044645 | 5/2003 |
| WO | WO-03/044956 | 5/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Alps Electric introduces the GlidePoint Wave Keyboard; combines a gently curved design with Alps' advanced GlidePoint Technology," Business Wire (Oct. 21, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

Ahl, David, "Controller Update," Creative Computing Vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct. 1994).

Baig, E.C., "Your PC Just Might Need a Mouse," U.S. News & World Report 108(22) (Jun. 4, 1990).

Bang & Olufsen Telecom a/s, "BeoCom 6000 User Guide 2000." 53 pages.

Bartimo, Jim, "The Portables: Travelling Quickly," Computerworld (Nov. 14, 1983).

Boling, Douglas (1993) "Programming Microsoft Windows CE.NET," p. 109.

Bray, "Phosphors help switch on xenon," Physics in Action, pp. 1-3, Apr. 1999.

Brink et al., "Pumped-up portables," U.S. News & World Report 116(21) (May 30, 1994).

Brown et al., "Windows on Tablets as a Means of Achieving Virtual Input Devices," Human-Computer Interaction—INTERACT '90 (1990).

(56) References Cited

OTHER PUBLICATIONS

Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
De Meyer, Kevin, "Crystal Optical Mouse," Feb. 14, 2002, Heatseekerz, Web Article 19.
"Der Klangmeister," Connect Magazine, Aug. 1998.
"Design News literature plus," Design News 51(24) (Dec. 18, 1995).
"Diamond Multimedia Announces Rio PMP300 Portable MP3 Music Player," located at http://news.harmony-central.com/Newp/1998/Rio-PMP300.html visited on May 5, 2008. (4 pages).
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews . . . are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Interlink Electronics, VersaPad: Integration Guide, ©1998 (VersaPad), pp. 1-35.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. (1994) "Development of the Touch Switches with the Click Response," Koukuu Denshi Gihou No. 17, pp. 44-48 (published by the Japan Aviation Electronics Industry, Ltd.).
Letter re: Bang & Olufsen a/s by David Safran, Nixon Peabody, LLP, May 21, 2004, with BeoCom 6000 Sales Training Brochure, 7 pages.
Luna Technologies International, Inc., LUNA Photoluminescent Safety Products, "Photoluminescence-What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Soderholm, Lars G., "Sensing Systems for 'Touch and Feel,'" Design News (May 8, 1989): pp. 72-76.
Sony presents "Choice Without Compromise" at IBC '97 M2 PRESSWIRE (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Sylvania, "Intellvision™ Intelligent Television Master Component Service Manual," pp. 1, 2 and 8, 1979.
"System Service and Troubleshooting Manual," www.dsplib.com/intv/Master, downloaded Dec. 11, 2002.
"Synaptics Tough Pad Interfacing Guide," Second Edition, Mar. 25, 1998, Synaptics, Inc., San Jose, CA, pp. 1-90.
Tessler, Franklin, "Point Pad," Macworld 12(10) (Oct. 1995).
Tessler, Franklin, "Touchpads," Macworld 13(2) (Feb. 1996).
Tessler, Franklin, "Smart Input: How to Chose from the New Generation of Innovative Input Devices," Macworld 13(5) (May 1996).
Translation of Trekstor's Defense Statement to the District Court Mannheim of May 23, 2008; 37 pages.
"Triax Custom Controllers due; Video Game Controllers," HFD—The Weekly Home Furnishing Newspaper 67(1) (Jan. 4, 1993).
"Touchpad," Notebook PC Manual, Acer Information Co. Ltd., Feb. 16, 2005, pp. 11-12.
Robbin, U.S. Appl. No. 60/346,237 entitled, "Method and System for List Scrolling," filed Oct. 22, 2001; 12 Pages.
Zadesky et al., U.S. Appl. No. 60/359,551 entitled "Touchpad for Handheld Device," filed Feb. 25, 2002; 34 pages.
Robbin et al., U.S. Appl. No. 60/387,692 entitled "Method and Apparatus for Use of Rotational User Inputs," filed Jun. 10, 2002; 34 pages.
Robbin et al., U.S. Appl. No. 60/399,806 entitled "Graphical User Interface and Methods of Use Thereof in a Multimedia Player," filed Jul. 30, 2002; 39 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices".
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404, filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.

(56) References Cited

OTHER PUBLICATIONS

Office Action issued Dec. 29, 2006, directed to CN Application No. 200510103886.3, 25 pages.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Aug. 7, 2009, directed to U.S. Appl. No. 11/610,181; 20 pages.
Tsuk et al., U.S. Office Action mailed Jul. 7, 2009, directed to U.S. Appl. No. 11/610,190; 24 pages.
Tsuk et al., U.S. Office Action mailed Dec. 31, 2009, directed to U.S. Appl. No. 11/610,190; 25 pages.
Tsuk et al., U.S. Office Action mailed Apr. 28, 2010, directed to U.S. Appl. No. 11/610,190; 29 pages.
Tsuk et al., U.S. Office Action mailed Aug. 6, 2010, directed to U.S. Appl. No. 11/610,190; 30 pages.
Tsuk et al., U.S. Office Action mailed Apr. 19, 2011, directed to U.S. Appl. No. 11/610,190; 25 pages.
Tsuk et al., U.S. Office Action mailed Nov. 1, 2010, directed to U.S. Appl. No. 11/959,918; 8 pages.
Tsuk et al., U.S. Office Action mailed Mar. 31, 2011, directed to U.S. Appl. No. 11/959,918; 9 pages.
Tsuk et al., U.S. Office Action mailed Oct. 26, 2010, directed to U.S. Appl. No. 11/959,942; 27 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Robbin et al., U.S. Office Action mailed Oct. 29, 2010, directed to U.S. Appl. No. 11/838,845; 8 pages.
Robbin et al., U.S. Office Action mailed Apr. 26, 2011, directed to U.S. Appl. No. 11/838,845; 9 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Zadesky et al., U.S. Office Action mailed Mar. 30, 2010, directed to U.S. Appl. No. 11/592,679; 13 pages.
Zadesky et al., U.S. Office Action mailed Mar. 31, 2011, directed to U.S. Appl. No. 11/882,005; 7 pages.
Ng et al., U.S. Office Action mailed Jan. 14, 2010, directed to U.S. Appl. No. 11/394,493; 20 pages.
Ng et al., U.S. Office Action mailed Jun. 22, 2010, directed to U.S. Appl. No. 11/394,493; 14 pages.
Ng et al., U.S. Office Action mailed Dec. 9, 2010, directed to U.S. Appl. No. 11/394,493; 13 pages.
Ng et al., U.S. Office Action mailed Jan. 15, 2010, directed to U.S. Appl. No. 11/882,423; 22 pages.
Ng et al., U.S. Office Action mailed Jul. 8, 2010, directed to U.S. Appl. No. 11/882,423; 19 pages.
Ng et al., U.S. Office Action mailed Oct. 26, 2010, directed to U.S. Appl. No. 11/882,423; 18 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Forsblad et al., U.S. Office Action mailed Jan. 27, 2009, directed to U.S. Appl. No. 11/882,421; 15 pages.
Lampell, U.S. Office Action mailed Sep. 15, 2009, directed to U.S. Appl. No. 11/530,807; 15 pages.
Lampell, U.S. Office Action mailed Jun. 4, 2010, directed to U.S. Appl. No. 11/530,807; 15 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Oct. 4, 2010, directed to U.S. Appl. No. 11/057,050; 31 pages.
Zadesky et al., U.S. Office Action mailed Mar. 5, 2009, directed to U.S. Appl. No. 11/477,469; 12 pages.
Zadesky et al., U.S. Office Action mailed Feb. 4, 2010, directed to U.S. Appl. No. 11/477,469; 14 pages.
Zadesky et al., U.S. Office Action mailed Nov. 16, 2010, directed to U.S. Appl. No. 11/477,469; 13 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Bollinger et al., U.S. Office Action mailed Mar. 21, 2011, directed to U.S. Appl. No. 11/842,724; 22 pages.
McKillop et al., U.S. Office Action mailed Sep. 16, 2010, directed to U.S. Appl. No. 11/591,752; 14 pages.
McKillop et al., U.S. Office Action mailed Mar. 24, 2011, directed to U.S. Appl. No. 11/591,752; 11 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al., U.S. Office Action mailed Oct. 4, 2007, directed to U.S. Appl. No. 11/806,957; 14 pages.

(56) References Cited

OTHER PUBLICATIONS

Zadesky et al., U.S. Office Action mailed Aug. 2, 2010, directed to U.S. Appl. No. 11/882,004; 9 pages.
Zadesky et al, U.S. Office Action mailed Feb. 1, 2011, directed to U.S. Appl. No. 11/882,004; 16 pages.
Zadesky et al., U.S. Office Action mailed Sep. 29, 2010, directed to U.S. Appl. No. 11/882,003; 13 pages.
Zadesky et al., U.S. Office Action mailed Mar. 16, 2011, directed to U.S. Appl. No. 11/882,003; 12 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Marriott et al., U.S. Office Action mailed Aug. 19, 2010, directed to U.S. Appl. No. 11/882,422; 13 pages.
Hotelling, U.S. Office Action mailed Sep. 1, 2009, directed to U.S. Appl. No. 11/482,286; 14 pages.
Hotelling, U.S. Office Action mailed Jan. 25, 2010, directed to U.S. Appl. No. 11/482,286; 17 pages.
Hotelling, U.S. Office mailed Jun. 9, 2010, directed to U.S. Appl. No. 11/482,286; 21 pages.
Hotelling, U.S. Office Action mailed Oct. 1, 2010, directed to U.S. Appl. No. 11/482,286; 28 pages.
Hotelling, U.S. Office Action mailed Dec. 8, 2010, directed to U.S. Appl. No. 11/482,286; 33 pages.
Hotelling, U.S. Office Action mailed Aug. 18, 2010, directed to U.S. Appl. No. 11/882,424; 16 pages.
Hotelling, U.S. Office Action mailed Apr. 29, 2011, directed to U.S. Appl. No. 11/882,424; 10 pages.
Hotelling, U.S. Office Action mailed Dec. 15, 2011, directed to U.S. Appl. No. 11/882,424; 16 pages.
Hotelling, U.S. Office Action mailed Jun. 21, 2012, directed to U.S. Appl. No. 11/882,424; 16 pages.
Hotelling, U.S. Office Action mailed Sep. 28, 2012, directed to U.S. Appl. No. 11/882,424; 11 pages.
Hotelling, U.S. Office Action mailed Jul. 2, 2014, directed to U.S. Appl. No. 14/293,843; 5 pages.
Hotelling, U.S. Office Action mailed Mar. 13, 2015, directed to U.S. Appl. No. 14/293,843; 11 pages.
Hotelling, U.S. Office Action mailed Oct. 11, 2012, directed to U.S. Appl. No. 12/498,119; 19 pages.
Hotelling, U.S. Office Action mailed Nov. 29, 2012, directed to U.S. Appl. No. 12/498,119; 19 pages.
Hotelling, U.S. Office Action mailed Sep. 23, 2013, directed to U.S. Appl. No. 12/498,119; 19 pages.
Hotelling et al., U.S. Office Action mailed Jul. 24, 2009, directed to U.S. Appl. No. 11/483,008; 17 pages.
Hotelling et al., U.S. Office Action mailed Mar. 30, 2010, directed to U.S. Appl. No. 11/483,008; 20 pages.
Hotelling et al., U.S. Office Action mailed Oct. 27, 2010, directed to U.S. Appl. No. 11/483,008; 23 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Elias et al., U.S. Office Action mailed Mar. 30, 2010, directed to U.S. Appl. No. 11/203,692; 15 pages.
Elias et al., U.S. Office Action mailed Jun. 11, 2010, directed to U.S. Appl. No. 11/203,692; 17 pages.
Elias et al., U.S. Office Action mailed Nov. 22, 2010, directed to U.S. Appl. No. 11/203,692; 6 pages.
Bull, U.S. Office Action mailed Jul. 9, 2010, directed to U.S. Appl. No. 11/849,801; 13 pages.
Bull, U.S. Office Action mailed Feb. 4, 2011, directed to U.S. Appl. No. 11/849,801; 22 pages.
Weber et al., U.S. Office Action mailed Jun. 7, 2010, directed to U.S. Appl. No. 11/856,530; 15 pages.
Weber et al, U.S. Office Action mailed Jan. 7, 2011, directed to U.S. Appl. No. 11/856,530; 13 pages.
Rathnam et al., U.S. Office Action mailed Mar. 24, 2011, directed to U.S. Appl. No. 12/205,757; 14 pages.
Weber et al., U.S. Office Action mailed Oct. 13, 2010, directed to U.S. Appl. No. 12/205,795; 15 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.

* cited by examiner

MUTUAL CAPACITANCE TOUCH SENSING DEVICE

This application is a continuation of U.S. patent application Ser. No. 14/293,843, filed Jun. 2, 2014, which is a continuation of U.S. patent application Ser. No. 12/498,119, filed Jul. 6, 2009, now U.S. Pat. No. 8,743,060, which is a continuation-in-part of U.S. patent application Ser. No. 11/482,286, filed Jul. 6, 2006, the entire contents of which are incorporated herein by reference.

This application is related to the following applications, all of which are herein incorporated by reference:

U.S. patent application Ser. No. 10/188,182, filed Jul. 1, 2002; U.S. patent application Ser. No. 10/722,948, filed Nov. 25, 2003; U.S. patent application Ser. No. 10/643,256, filed Aug. 18, 2003; U.S. patent application Ser. No. 10/840,862, filed May 6, 2004; U.S. patent application Ser. No. 11/057,050, filed Feb. 11, 2005; U.S. patent application Ser. No. 11/115,539, filed Apr. 26, 2005; and U.S. patent application Ser. No. 11/882,420, filed Aug. 1, 2007.

FIELD

This relates generally to touch sensing devices used in portable electronic devices and, more particularly, to an improved mutual capacitance sensing touch device.

BACKGROUND

There can be many factors that determine the size of compact portable electronic devices such as laptops, PDAs, media players, cell phones, etc. In most cases, the size of the portable electronic device can be limited by the size of the operational components used therein. These components can include for example microprocessor chips, printed circuit boards, displays, memory chips, hard drives, batteries, interconnectivity circuitry, indicators, input mechanisms and the like. As such, there can be a desire to make these operational components smaller and smaller while maintaining or increasing their power and functionality to perform operations as well as decreasing their cost. The placement of these components inside the electronic device can also be a factor in determining the size of the portable electronic device. For thin devices such as cell phones, PDAs and media players, stacking operational components on top of each other can be limited and therefore the operational components may be placed side by side. In some cases, the operational components may even communicate through wires or flex circuits so that they may be spaced apart from one another (e.g., not stacked).

There exist today many styles of input mechanisms for performing operations in a portable electronic device. The operations can generally correspond to moving objects and making selections. By way of example, the input devices may include buttons, keys, dials, wheels, mice, trackballs, touch pads, joy sticks, touch screens and the like. Touch devices such as touch buttons, touch pads and touch screens are becoming increasingly popular in portable electronic devices because of their ease and versatility of operation, their declining price as well as their space saving ability (e.g., planarity). Touch devices can allow a user to make selections and move objects by simply moving their finger (or stylus) relative to a touch sensing surface. In general, the touch device can recognize a touch and in some circumstances the characteristics of the touch and a host controller of the portable electronic device can interpret the touch data and thereafter perform action based on the touch data.

There are several types of technologies for implementing a touch device including for example resistive, capacitive, infrared, surface acoustic wave, electromagnetic, near field imaging, etc.

Capacitive touch sensing devices can work particularly well in portable electronic devices. Generally speaking, whenever two electrically conductive members come close to one another without actually touching, their electric fields can interact to form capacitance. In the case of a capacitive touch device, as an object such as a finger approaches the touch sensing surface, a tiny capacitance can form between the object and the sensing points in close proximity to the object. By detecting changes in capacitance at each of the sensing points and noting the position of the sensing points, the sensing circuit can recognize multiple objects and determine the location, pressure, direction speed and acceleration of the object as it is moved across the touch surface.

Although capacitive sensing devices can work particularly well in portable electronic devices, improvements to form, feel and functionality are still desired, such as improvements that can help produce a better portable electronic device.

SUMMARY

This relates to a touch sensing device, which can include nodes for sensing a touch at the device and for sensing a force applied to the device. The device can include distinct individual drive lines for driving the nodes and separate distinct individual sense lines for transmitting touch or force signals from the nodes. The nodes can form groups, where the nodes in each group can be coupled to the same drive line and to different sense lines and where each node in a group can be coupled to a node in a different group by the same sense line. This device structure can advantageously reduce the number of drive and sense lines, thereby saving device space and reducing device power consumption. Each node can be set up with a different combination of drive and sense lines coupled thereto.

This also relates to a touch sensing device, which can include a node having a touch sensor for sensing a touch at the device and a dome switch for sensing a force applied to the device. The dome switch can be coupled to ground to reduce signal error associated with the sensed touch, where the signal error can be introduced by a slight deformation in the dome switch caused by a slight movement of the touch sensing device surface. This device structure can advantageously improve the performance of the device in sensing touch.

This also relates to a touch sensing device, which can include some nodes having both a touch sensor for sensing a touch at the device and a dome switch for sensing a force applied to the device and other nodes having just a touch sensor. So that the nodes having both the touch sensor and the dome switch can constructively interact, the conductive pattern of the touch sensor components can substantially match the conductive pattern of its corresponding dome switch. This device structure can advantageously improve the performance of the device in sensing touch.

DETAILED DESCRIPTION

Figure 1:
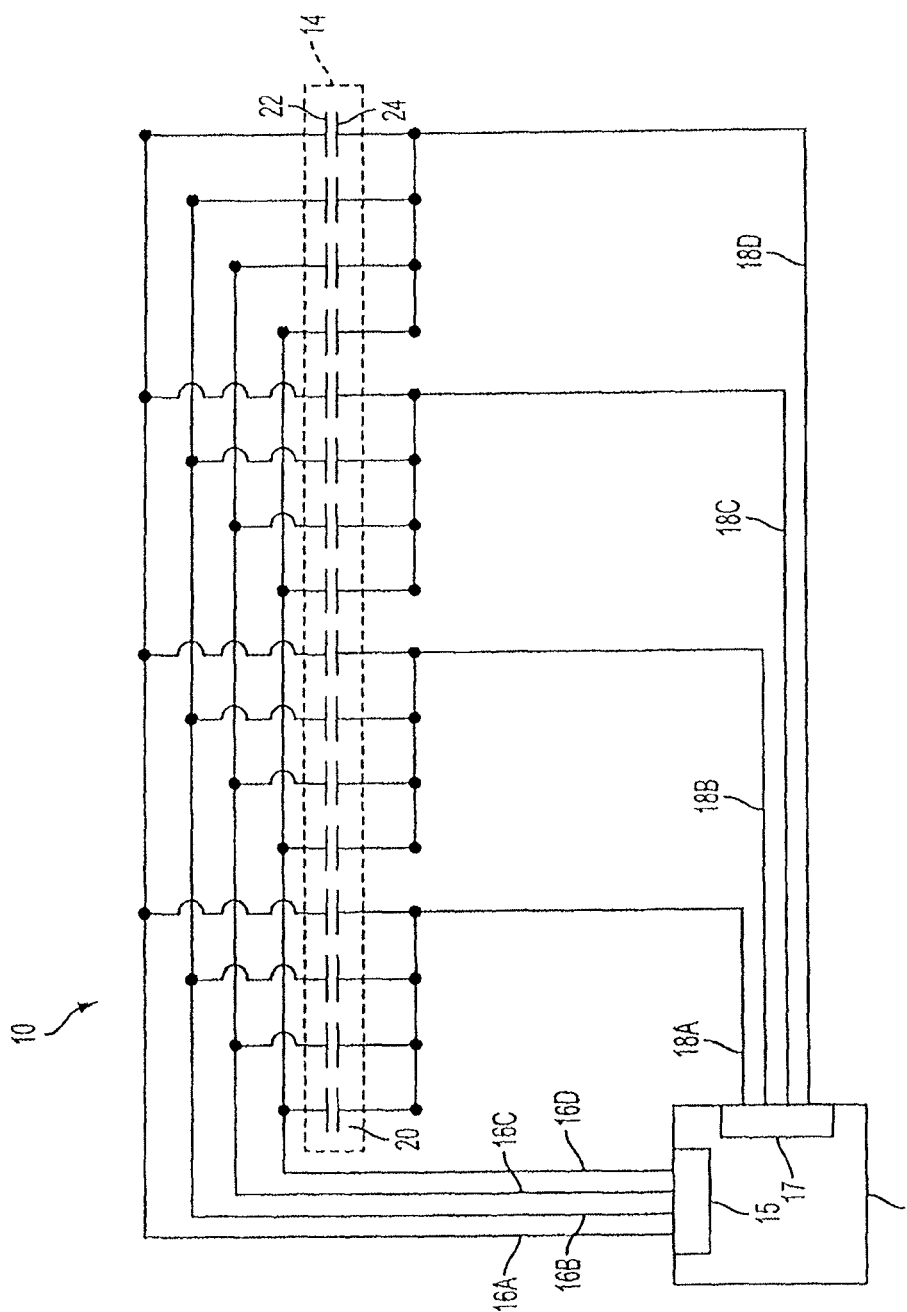
FIG. 1 illustrates an exemplary circuit diagram of a mutual capacitive sensing input device according to various embodiments.

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

The simplicity of capacitance can allow for a great deal of flexibility in design and construction of a sensing device. By way of example, the sensing device may be based on self capacitance or mutual capacitance.

In self capacitance, each of the sensing points can be provided by an individually charged electrode. As an object approaches the surface of the touch device, the object can capacitively couple to those electrodes in close proximity of the object, thereby stealing charge away from the electrodes. The amount of charge in each of the electrodes can be measured by the sensing circuit to determine the positions of objects as they touch the touch sensitive surface.

In mutual capacitance, the sensing device can typically include a two-layer grid of spatially separated wires. In the simplest case, the upper layer can include lines in rows, while the lower layer can include lines in columns (orthogonal). The sensing points can be provided at the intersections of the rows and columns. During operation, the rows can be charged and the charge can capacitively couple to the columns at the intersection. As an object approaches the surface of the touch device, the object can capacitively couple to the rows at the intersections in close proximity to the object, thereby stealing charge away from the rows and therefore the columns as well. The amount of charge in each of the columns can be measured by the sensing circuit to determine the positions of multiple objects when they touch the touch sensitive surface.

Each of these capacitive sensing methodologies can have advantages and disadvantages to be taken into account when designing a capacitive touch input device. For example, while self capacitance may be arranged in a wide variety of orientations (both 2D and non 2D arrays), it can tend to produce a large number of I/O contacts especially as the resolution of the touch pad is increased (each electrode can require a separate I/O contact). The large number of I/O contacts can create design difficulties especially in portable devices that are small. For example, the portable devices may require large chips and/or additional chips in order to process the large number of I/O contacts. These chips however can take up valuable space inside the device and create stack up such that the device may need to be larger to accommodate the chip(s). Furthermore, routing the I/O through traces from the electrodes to the chips may further exacerbate this problem as well as create new ones.

Unlike self capacitance, mutual capacitance can reduce the number of I/Os for the same resolution (sometimes by a factor of two). However, conventional mutual capacitance circuits can be fixed to a 2D array of rows and columns (e.g., x and y) thus preventing uniquely shaped touch surfaces (e.g., non 2D arrays). Furthermore, while rows and columns that are used in mutual capacitive sensing circuits may be well suited for tracking or pointing, this arrangement may not be as well suited for other less complicated tasks associated with some application specific portable electronic devices. This can be especially true when you consider the desire to maintain a small form factor with limited I/O contacts. Examples of less complicated tasks may include for example selection tasks, such as buttoning, and object movement tasks, such as scrolling. Another problem with mutual capacitance may be in its accuracy due to parasitic capacitance that can be created using this methodology. Yet another problem with both technologies may be that they can only be capable of reporting a single point when multiple objects are placed on the sensing surface. That is, they can lack the ability to track multiple points of contact simultaneously.

Various embodiments therefore pertain to improved features for touch devices used in portable electronic devices and more particularly for touch devices that are based on capacitance. In some embodiments, a mutual capacitive sensing touch device can include capacitive sensing nodes that can reduce the number of I/O contacts and be positioned in any orientation (e.g., 2D arrays need not be a requirement). In fact, in some embodiments, the capacitive sensing nodes can be placed in a non 2D array. This can present a paradigm shift in the way that designers think about mutual capacitive sensing touch devices. For example, the capacitive sensing nodes can be positioned at angular positions in a circular manner.

These and other embodiments are discussed below with reference to FIGS. 1-30. However, those skilled in the art will readily appreciate that the detailed description given herein with respect to these figures is for explanatory purposes and not limited to the various embodiments.

FIG. 1 illustrates an exemplary circuit diagram of a mutual capacitive touch sensing input device 10 according to various embodiments. The mutual capacitive touch sensing input device 10 can be configured to utilize a limited number of I/O contacts while maximizing its resolution, minimizing its size, and providing a multiplicity of orientations including non 2D arrays. Because of this, the input device may for example be placed in a variety of portable electronic devices and serve a wide variety of functions including for example scrolling, parameter control and buttoning. In fact, the input device can work particularly well in small compact handheld devices such as cell phones and media players (e.g., music players, game players, video players, etc.).

The input device 10 can include a mutual capacitive sensing controller 12 that can communicate with a touch sensitive element 14. The touch sensitive element 14 can include multiple independent and spatially distinct mutual capacitive sensing nodes 20 that can be positioned about a touch surface of the touch sensitive element 14. The nodes 20 can be dispersed such that each node 20 can represent a different position on the touch surface. During operation, each of the mutual capacitive sensing nodes 20 can produce a capacitance, and the mutual capacitive sensing controller 12 can detect changes in the capacitance at each of the nodes 20. This information can be used to determine touch events. In most cases, the nodes 20 can be coupled to the sensing controller 12 through traces or other well-known routing technologies such as those associated with printed circuit boards, flex circuits and integrated chips.

The touch sensitive element 14 can be widely varied. In some cases, it can be mounted to or within a housing of the portable electronic device. For example, the element 14 may be utilized in a touch pad that is mounted within an opening in the housing of the portable electronic device. The touch pad may be a fixed to the portable electronic device or it may be movable so as to engage one or more actuators such as switches. In other cases, the touch sensitive element 14 can be a thin layer applied over a component of the portable electronic device including for example the housing or a display of the portable electronic device. By way of example, the element 14 may be used to create a touch screen (e.g., over laid on top of a display). The touch screen may be a fixed to the portable electronic device or it may be movable so as to engage one or more actuators such as switches. Alternatively, the element 14 may be a portion of the housing (e.g., nodes are embedded inside the housing or adhered to the inside surface of the housing of the portable electronic device). Examples of various ways of situating the touch sensitive element 14 relative to an electronic device can be found in U.S. patent application Ser. Nos. 10/188,182, 10/722,948, 10/643,256, 10/840,862, 11/057,050 and 11/115,539, which are herein incorporated by reference.

The mutual capacitive sensing controller 12 can also be widely varied. In some cases, the mutual capacitive sensing controller 12 can be a separate controller that can be operatively coupled to a host controller of a portable electronic device (e.g., for example using a flex circuit or printed circuit board). In other cases the controller 12 can be integrated into the host controller of the electronic device. That is, the sensing controller 12 can be part of the host controller. Integration may be possible due to the reduced number of I/O contacts required by mutual capacitance technology.

Referring to FIG. 1, the mutual capacitive sensing controller 12 can communicate with the nodes 20 via multiple distinct drive lines 16 and multiple distinct sense lines 18. The drive lines 16 can be configured to carry current from the controller 12 to the mutual capacitive coupling nodes 20 and the sensing lines 18 can be configured to carry a current from the mutual capacitive coupling nodes 20 to the capacitive controller 12. The drives lines 16 can capacitively couple to each of the sense lines 18 at multiple capacitive sensing nodes 20. Each node 20 can be set up with a different combination of drive and sense line 16 and 18. For example, in the illustrated embodiment, the circuit 10 can include four chive lines 16 and four sense lines 18 thereby forming sixteen individual nodes 20. The number of nodes 20 can typically be the number of drive lines multiplied by the number of sense lines. In some cases, the nodes can be formed by an equal number of drive lines and sense lines. For example, the circuit may include the following arrangement of drive/sense-nodes, 2/2-4, 3/3-9, 4/4-16, 5/5-25, 6/6-36, 7/7-49, 8/8-64, 9/9-81, 10/10-100, and so on. In other cases, the nodes can be formed by a different number of drive and sense lines. For example, the circuit may include the following arrangement of drive/sense-nodes 2/3-6, 3/5-15, 4/6-24, 5/8-40, 7/9-63, 9/10-90, and so on. It should be further pointed out that in some limited circumstances, the nodes may not equal the number of drive lines multiplied by the number of sense lines. For example, the number of nodes may be smaller than this number. This may be done in cases where the required number of nodes can be a primary number [e.g., the designer simply does not make a node(s) even though there is a drive line(s) and sense line(s) to do so]. Accordingly, any number of nodes may be produced.

As shown, the drive lines 16 can be connected to a voltage source 15 that can separately drive the current through each of the driving lines 16. That is, the stimulus can only be happening over one line while all the other lines can be grounded. They may be driven similar to a raster scan. The sensing lines 18, on the other hand, can be connected to a mutual capacitive sensing circuit 17 that can monitor the sensing lines 18. In one embodiment, this can be accomplished with independent sensing circuits that can each monitor an individual sensing line. In this manner, the mutual capacitive sensing circuit 17 can be capable of continuously monitoring the sensing lines 18 at the same time. That is, the mutual capacitive sensing circuit 17 can always monitor the capacitance through the sensing lines 18. In another embodiment, instead of the sensing lines being all read at the same time by independent circuits, the sensing lines may be sequentially switched to a common sensing circuit and read one after the other (e.g., multiplexing). This can tend to reduce the silicon area of the chip but it can also increase the scanning time.

Although not shown in great detail in FIG. 1, each node 20 can include a drive electrode 22 coupled to one of the drive lines 16 and a sense electrode 24 coupled to one of the sense. This may for example be accomplished via traces or other related circuitry. The electrodes 22 and 24 can be spatially separated and can therefore cooperate to capacitively couple a charge therethrough. The electrodes 22 and 24 may be arranged in a variety of ways. In one implementation, the electrodes 22 and 24 can be plates that can be juxtaposed next to one another in a side-by-side relationship thereby creating fringe fields when the drive electrode 22 is driven. In another implementation, the spaced apart electrodes 22 and 24 can be disposed below an electrically isolated "floating" electrode. These and other embodiments will be described below.

Unlike conventional mutual capacitance devices, which can have nodes that can be fixed to intersection points of upper rows and lower columns, the electrode arrangement disclosed herein can allow each node 20 to be placed at any location within a touch surface. This can be similar to self capacitance technology that can utilize individual electrodes at each node. However, unlike self capacitance technology, the mutual capacitance technology can reduce the number of I/O contacts required for the desired number of nodes. In self capacitance, each node can include a distinct I/O contact and therefore to achieve sixteen nodes, at least seventeen I/O contacts may be needed (one being for return ground). In essence, the various embodiments described herein can provide the benefits of each type of technology (e.g., nodes that can be placed anywhere while limiting the number of I/O contacts for a given resolution). Furthermore, although the nodes 20 may typically be placed on a planar surface, in some circumstances the nodes 20 may be placed on a contoured surface. Moreover, the nodes 20 may be placed on multiple surfaces such as multiple sides of a portable electronic device.

Because the node location is not limited, the nodes 20 may be positioned in a conventional 2D array of rows and columns or alternatively they may be positioned in a non 2D array thereby allowing a wide variety of user interfaces to be created. In fact, non 2D arrays may be beneficial in creating user interfaces that better fit portable electronic devices. For example, different orientations of nodes 20 may be used to provide input functionality that can be directed at the specific applications of the portable electronic device. The user interfaces may for example include scrolling regions or parameter control regions where nodes can be set up in succession along a predetermined path, and/or button regions where individual nodes may represent distinct button functions. With regards to a scrolling or parameter control, the nodes may be placed in an open loop arrangement such as a line, or they may be placed in closed loop arrangement such as a circle. Generally speaking, the nodes can be placed to form any shape whether in a single plane or multiple planes. Examples can include squares, rectangles, circles, semi-circles, ovals, triangles, trapezoids, other polygons, pill shapes, S shapes, U shapes, L shapes, star shapes, plus shape, etc.

Any number of nodes 20 may be used. The number of nodes 20 can typically be determined by the size of the touch device as well as the size of the electrodes 22 and 24 used at the nodes 20. In many cases, it may be desirable to increase the number of nodes 20 so as to provide higher resolution (e.g., more information can be used for such things as acceleration). However, as the number increases, so can the number of I/Os. Therefore a careful balance between resolution and number of I/Os can be made when designing the touch device.

Furthermore, the size and shape of the nodes 20 may vary according to the specific needs of the touch device. Generally speaking, the nodes 20 can be formed from almost any shape and size. For example they may be formed as squares, rectangles, circles, semi-circles, ovals, triangles, trapezoids, other polygons and or more complicated shapes such as wedges, crescents, stars, lightning bolts, etc. In some cases, at least a portion and in some cases all the nodes 20 can be identical. That is, they can have the same size and shape. In other cases, at least a portion and in some cases all the nodes 20 can have different sizes and/or shapes. For example, a first set of nodes 20 may have a first shape and a second set of nodes 20 may have a second shape that is different than the first shape. The configuration can typically depend on the functionality that the touch device provides. For example, scrolling or parameter control nodes may be configured similarly within a scrolling or parameter control region, and button nodes may be configured differently than scrolling or parameter control nodes and each other. In essence, the size and shape can depend on the desired functionality. If the functionality is the same then the size and shape the nodes can tend to be same. If one functionality is more dominant than another functionality, then the size and shape can be matched accordingly. In some cases, the size of the nodes can correspond to about the size of a fingertip. In other cases, the size of the nodes can be smaller than the size of a finger tip so as to improve the resolution of the touch device (the finger can influence two of more nodes at anyone time thereby enabling interpolation).

During operation, the controller 12 can direct a voltage to be applied to each drive line 16 separately. This can happen sequentially until all the lines have been driven. For example, a voltage may first be applied to the first drive line 16A, then the second drive line 16B, then the third drive line 16C and then the forth drive line 16D. Once all the lines have been driven, the sequence can start over (continuously repeats). On the other hand, in one embodiment, the capacitive sensing circuit 17 of the controller 12 can sense all of the sensing lines 18 in parallel. That is, each time a drive line is driven, each of the sensing lines 18A-18D can be monitored. This can typically be accomplished with independent circuits. Alternatively, in another embodiment, each sense line may be monitored in sequence, to share the same sensing circuit (e.g. multiplexing each line to the sense circuit on-chip).

More particularly, because of the capacitive coupling, when a current is driven through a driving line 16, the current can be carried through to the sensing lines 18A-D at each of the nodes 20 coupled to the driving line 16. The sensing circuit 17 can monitor the change in capacitance that can occur at each of the nodes 20 via the sensing lines 18A-D. The positions where changes occur and possibly the magnitude of those changes can be used to help recognize touch events.

When no object is present, the capacitive coupling at the node 20 can stay fairly constant. When an object such as a finger is placed proximate the node 20, the capacitive coupling can change through the node 20. The object can effectively shunt some of the field away so that the charge projected across the node 20 can be less, i.e., the object can steal charge thereby affecting the capacitance. The change in capacitive coupling can change the current carried by the sensing lines 18A-D. The capacitance circuit 17 can note the current change and the particular node 20 where the current change occurred and can report this information in a raw or in some processed form to the host controller of the portable electronic device.

Although not shown in great detail in FIG. 1, the circuit 17 may additionally include filters for eliminating parasitic capacitance, which may for example be created when nodes, contacts and/or routing circuitry are located closely together. Generally speaking the filter can reject stray capacitance effects so that a clean representation of the charge transferred across the node can be outputted (and not anything in addition to that). That is, the filter can produce an output that is not dependent on the parasitic capacitance, but rather on the capacitance at the node 20. As a result, a more accurate output can be produced. In one embodiment, the filters can be embodied as inverting amplifiers that can null the input voltage through each sense line.

Figure 2:
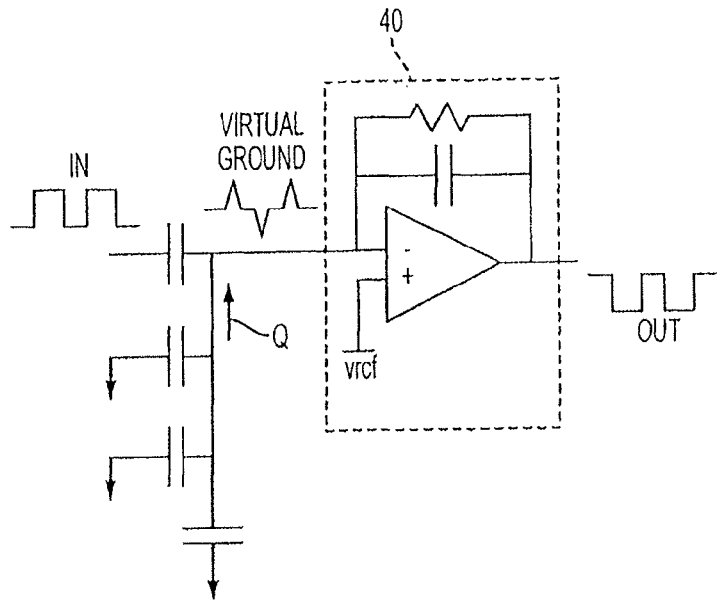
FIG. 2 illustrates an exemplary circuit diagram of a filter arrangement of a mutual capacitance sensing circuit according to various embodiments.

FIG. 2 illustrates an exemplary circuit diagram of a filter arrangement of a mutual capacitance sensing circuit according to various embodiments. In the example of FIG. 2, a filter embodied as inverting amplifier 40 may be used in the circuit 17 of FIG. 1 in order to reduce the parasitic capacitance. As shown, the inverting amplifier can include a non inverting input that can be held at a constant voltage (in this case ground), an inverting input that can be coupled to the node, and an output that can be coupled to the capacitive sensing circuit 17. The output can be coupled back to the inverting input through a capacitor and/or resistor. During operation, the input from the node may be disturbed by stray capacitance effects, i.e., parasitic capacitance. If so, the inverting amplifier can be configured to drive the input back to the same voltage that it had been previously before the stimulus. As such, the value of the parasitic capacitance may not matter.

Analyzed from the circuit standpoint, the charge Q when injected into the circuit can be proportional to the change in voltage. Because the change in voltage is nulled, the input can be kept at a constant voltage, and therefore the net change that goes in and out of the node can be zero, which means the error signal at output of op amp can be zero contribution related to the parasitics caused by other nodes.

Figure 3A:
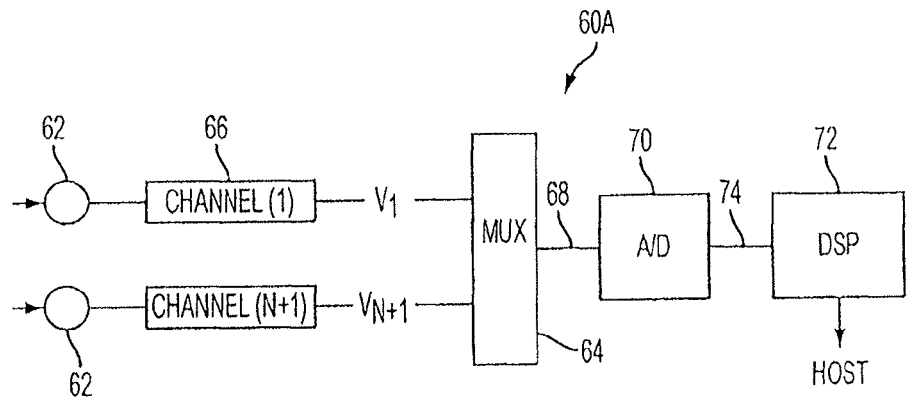
FIG. 3A illustrates an exemplary block diagram of a mutual capacitive sensing circuit according to various embodiments.

FIG. 3A illustrates an exemplary block diagram of a capacitive sensing circuit 60 according to various embodiments. The capacitive sensing circuit 60 may for example correspond to the capacitive sensing circuits described in FIG. 1. The capacitive sensing circuit 60 can be configured to receive input data from multiple sensing points 62 (electrode, nodes, etc.), to process the data and to output processed data to a host controller.

The sensing circuit 60 can include a multiplexer 64 (MUX). The multiplexer 64 can be a switch configured to perform time multiplexing. As shown, the MUX 64 can include multiple independent input channels 66 for receiving signals from each of the sensing points 62 at the same time. The MUX 64 can store all of the incoming signals at the same time, but can sequentially release them one at a time through an output channel 68.

The sensing circuit 60 can also include an analog to digital converter 70 (ADC) operatively coupled to the MUX 64 through the output channel 68. The ADC 70 can be configured to digitize the incoming analog signals sequentially one at a time. That is, the ADC 70 can convert each of the incoming analog signals into outgoing digital signals. The input to the ADC 70 can generally correspond to a voltage having a theoretically infinite number of values. The voltage can vary according to the amount of capacitive coupling at each of the sensing points 62. The output to the ADC 70, on the other hand, can have a defined number of states. The states can generally have predictable exact voltages or currents.

The sensing circuit 60 can also include a digital signal processor 72 (DSP) operatively coupled to the ADC 70 through another channel 74. The DSP 72 can be a programmable computer processing unit that can work to clarify or standardize the digital signals via high speed mathematical processing. The DSP 74 can be capable of differentiating between human made signals, which can have order, and noise, which can be inherently chaotic. In most cases, the DSP can perform filtering and conversion algorithms using the raw data. By way of example, the DSP may filter noise events from the raw data, calculate the touch boundaries for each touch that occurs on the touch screen at the same time, and thereafter determine the coordinates for each touch event. The coordinates of the touch events may then be reported to a host controller where they can be compared to previous coordinates of the touch events to determine what action to perform in the host device.

Figure 3B:
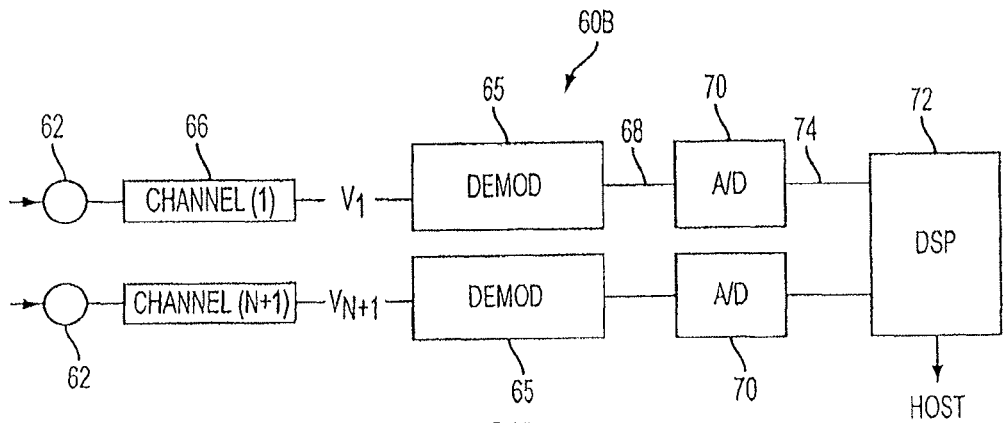
FIG. 3B illustrates another exemplary block diagram of a mutual capacitive sensing circuit according to various embodiments.

Another embodiment of the capacitive sensing circuit is shown in FIG. 3B. This embodiment is similar to FIG. 3A, but more simplified. In this embodiment, channel 66 can be followed by its own dedicated demodulator 65 and A/D converter 70. The demodulator can be basically an analog multiplier with one input tied to the pulse generator signal, and the other input tied to the output of the channel charge amplifier. The output of the demodulator can feed the A/D converter, which can be a delta-sigma type of converter.

In one implementation of this embodiment, the circuit can wait until a timer (or host controller) indicates that a sensing cycle should begin. Thereafter, a pulse train can be sent to the first drive line (e.g., 12 pulses which can be each 3 uS period). Then, synchronous charge coupling can be sensed on all sense lines. This may for example be accomplished by demodulating the charge transferred to the sense lines using the pulse train phase and frequency reference. Thereafter, an A/D conversion can be performed on the sensed synchronous charge transfer for each sense line. Then, each data can be associated with the specific capacitor being sensed, which can be identified by the combination of the particular drive line and sense line which can be connected to the capacitor of interest. Then, the data from the A/D converter can be signal processed using techniques such as baseline subtraction, low pass filter, etc. Thereafter, the processed data can be communicated to the host to be acted on in an appropriate manner. This method may be repeated for each drive line.

A variety of nodes that can be utilized in the embodiments described above will now be described in conjunction with FIGS. 4-7. It should be appreciated that this is by way of example and not by way of limitation of the various embodiments.

Figure 4:
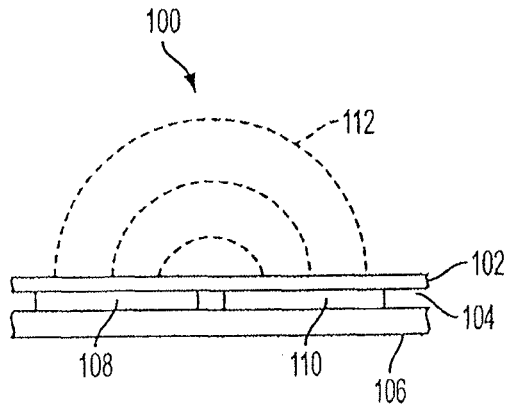
FIG. 4 illustrates an exemplary mutual capacitive sensing node according to various embodiments.

FIG. 4 illustrates an exemplary mutual capacitive sensing node according to various embodiments. The node 100 can be formed from various layers including a cover film 102, an electrode layer 104 and a substrate 106. The cover film 102 can be disposed over the electrode layer 104 and the electrode layer 104 can be disposed over the substrate 106. The electrode layer 104 can include a drive electrode 108 and a sense electrode 110 that can be spaced apart from one another in order to electrically isolate them from each other. The drive electrode 108 can be coupled to a drive line and the sense electrode 110 can be coupled to a sense line. When the drive electrode 108 is driven with a voltage or current, the voltage or current can be capacitively coupled to the sense electrode 110 via fringe fields 112 that can come up through the cover film 102. When an object is placed over the node 100, the object can shortcut or steal some of the field lines 112 away effectively reducing the capacitance coupled through the node 100.

The electrodes 108 and 110 may be formed from almost any shape and size. For example they may be formed as squares, rectangles, circles, semi-circles, ovals, triangles, trapezoids, other polygons and or more complicated shapes such as wedges, crescents, stars, lightning bolts, etc. The size and shape of the electrodes 108 and 110 can typically depend on the size and shape of the node 100. In some cases, the electrodes 108 and 110 can be equal pairs having the same size and shape. For example, the node 100 may be divided equally in half. In other cases, the electrodes 108 and 110 can be disparate pairs having different sizes and/or shapes. For example, the drive electrode 108 may have a first size and/or shape and the sense electrode 110 may have a second size and/or shape that is different than the first shape. By way of example, it may be beneficial to have a larger drive electrode and a smaller sense electrode (or vice versa).

Figure 5:
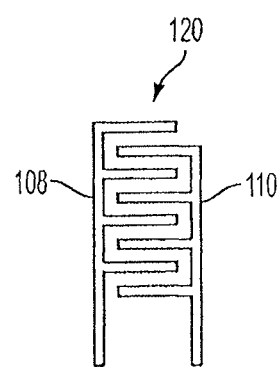
FIG. 5 illustrates another exemplary mutual capacitive sensing node according to various embodiments.

FIG. 5 illustrates another exemplary mutual capacitive sensing node according to various embodiments. The node 120 can be similar to the node 100 described in FIG. 4 except that the drive electrode 108 and sense electrode 110 can be interleaved rather than being juxtaposed plates.

Figure 6:
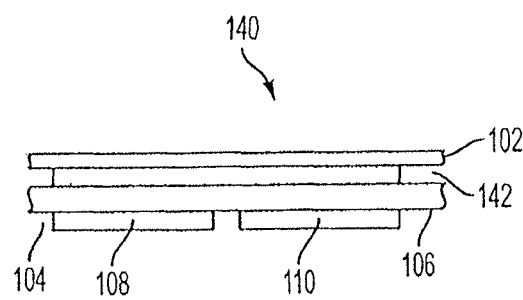
FIG. 6 illustrates still another exemplary mutual capacitive sensing node according to various embodiments.

FIG. 6 illustrates still another exemplary mutual capacitive sensing node according to various embodiments. The node 140 can be similar to the nodes 100 or 120 described in FIGS. 4 and 5 in that it can use spaced apart electrodes 108 and 110. However, unlike the embodiments described above, the node 140 can further include a floating (electrically isolated) electrode 142 disposed above the electrode pairs 108 and 110. As shown, the drive and sense electrodes 108 and 110 can be disposed underneath a substrate 106, and the floating electrode 142 can be disposed over the substrate 106. Furthermore, the cover film 102 can be disposed over the floating electrode 142. In this embodiment, the driving current can be capacitively coupled to the floating electrode from the driving electrode 108 then it can be capacitively coupled to the sense electrode 110. Moreover, the outer dimension of the floating electrode 142 can typically match the outer dimensions of the electrode pairs 108 and 110, although in some circumstances it may be desirable to make the outer dimension of the floating electrode 142 smaller or larger than the outer dimension of the electrode pairs 108/110.

Figure 7A:
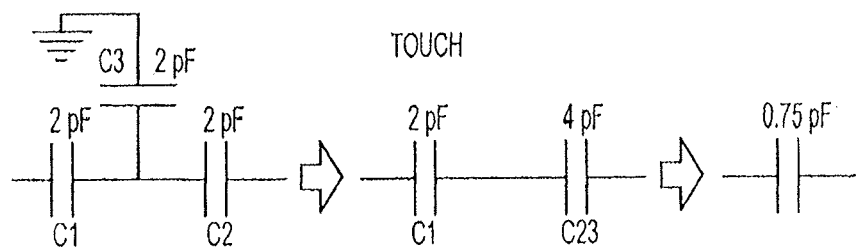
FIGS. 7A and 7B show the embodiment of FIG. 6 in exemplary circuit diagram form.
Figure 7B:
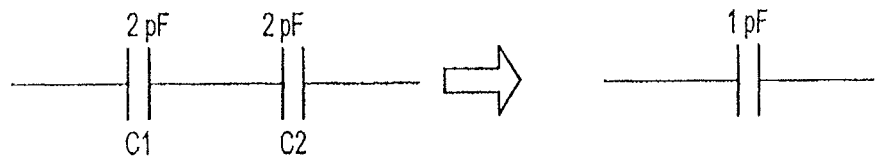

FIGS. 7A and 7B show the embodiment of FIG. 6 in exemplary circuit diagram form. In this illustration, C1 can be the capacitance between the drive electrode 108 and the floating electrode 142, C2 can be the capacitance between the floating electrode 142 and the sense electrode 110, and C3 can be the capacitance between a finger 144 and the floating electrode 142. C3 can be the only capacitance that changes (only exists when a finger or other related object is present).

For illustration purposes, assume that a typical value for C1 can be 2 pF, C2 can be 2 pF and C3 can be 2 pF. When there is no touch, the capacitance C1 and C2 can be placed in series thereby creating a total net capacitance of 1 pF. This capacitance can be fed through a sense line and read by the capacitance sensing circuit. When there is a touch, the capacitance C2 and C3 can be first combined together (because the sense electrode can be held at virtual ground) then the capacitance C1 (2 pF) and C23 (4 pF) can be placed in series thereby creating a total net capacitance of (4 pF*2 pF)/(4 pF+2 pF)=8/6 pF. However, the total charge transfer can split equally between C2 and C3, so the charge transfer through C2 can be ½ of the total, or ⅔ pF. This capacitance can be fed through a sense line and read by the capacitance sensing circuit. The capacitance sensing circuit can differentiate between a no touch and a touch by checking these values (e.g., no touch=1 pF, touch=something other than 1 pF). The value of the capacitance for a touch may further be used to determine touch pressure as the capacitance can typically change with increased pressure.

Referring to all the node designs mentioned above (FIGS. 4-7), the substrate 106 may for example be a printed circuit board or a flexible membrane such as those of a flex circuit or some other suitable material for supporting the electrodes 108 and 110 thereon (e.g., housing of portable electronic device). Furthermore, the electrodes 108 and 110 may be formed from any thin conductive material. By way of example, the electrodes 108 and 110 may be embodied as a metallic foil that can be adhered to the substrate 106, a conductive paint or ink that can be coated on the substrate 106, a conductive material that can be printed, deposited or etched on the substrate 106, plates or bands that can be molded or embedded into the substrate 106 or any other suitable arrangement. Moreover, the cover film 102 may be formed from any suitable dielectric material such as glass or plastic. The cover film 102 can serve to protect the underlayers and provide a surface for allowing an object to slide thereon. The cover film 102 can also provide an insulating layer between the object and the electrode layer 104. Furthermore, the cover film 102 can be suitably thin to allow sufficient electrode coupling.

In some cases, the various layers may further be embodied as transparent or semi transparent materials. For example, the conductive material of the electrodes may be formed from indium tin oxide (ITO), the dielectric material of the film may be formed as clear or partially transparent plastic or glass, and the substrate may be formed as clear or partially transparent plastic or glass (e.g., clear Mylar™ sheet). This may be done to allow visual feedback through the various layers of the touch device.

Moreover, the electrode layer 104 may include interconnects for coupling the electrodes 108 and 110 to the driving and sensing lines. Alternatively, the driving and sensing lines may be formed with the electrodes 108 and 110 in the same step/layer.

In one implementation, the electrodes can be placed on one side of a printed circuit board (PCB), and the mutual capacitance sensing circuit in the form of an integrated circuit chip can be mounted on the back side of the chip, with conventional PCB routing connecting the I/O contacts of the electrodes to the I/O contacts of the IC chip. The IC chip may for example be an ASIC. In another implementation, the electrodes can be placed on one side of a printed circuit board (PCB) and the I/O contacts can be coupled to the I/O contacts of a floating IC via a flex circuit with printed traces (sensing and driving lines). For example, the PCB containing the electrodes can be connected to one end of a flex circuit and the sensor IC can be attached to the other end of the flex circuit. Alternatively, the electrodes may be applied directly to the flexible member of the flex circuit.

Several touch devices 200-290 with nodes 202 set up in a non 2D array will now be described in conjunction with FIGS. 8-17. It should be appreciated that these are given by way of example and not by way of limiting the various embodiments.

In most of these embodiments, the touch devices can include multiple nodes 202 that can be positioned side by side along a predetermined path. This arrangement can work particularly well for performing scrolling operations or parameter control operations. The path may be a closed loop path or an opened loop path. Furthermore, each of the nodes 202 can include an electrode pair of drive electrode 204 and sense electrode 206. Moreover, the number of drive lines 208 can be equal to the number of sense lines 210, and further the number of nodes 202 can be the square of this number. Alternatively, the number of drive lines 208 can be different from the number of sense lines 210, and further the number of nodes 202 can be the multiplicative product of the numbers of drive and sense lines. It should be appreciated however that this is not a limitation.

Figure 8:
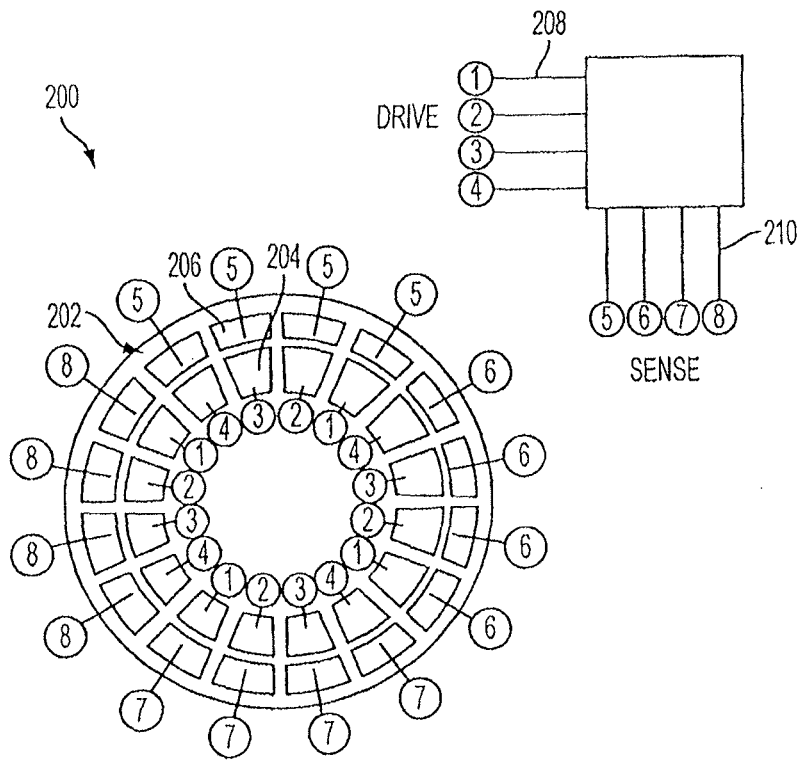
FIG. 8 illustrates an exemplary circular touch sensing device according to various embodiments.

FIG. 8 illustrates an exemplary circular touch device according to various embodiments. The circular touch device 200 can be divided into several independent and spatially distinct nodes 202 that can be positioned in a circular manner. Each of the nodes 202 can represent a different angular position within the circular shape. Although not shown, the nodes may also be placed at radial locations from the center of the touch surface to the perimeter of the touch surface.

Figure 9:
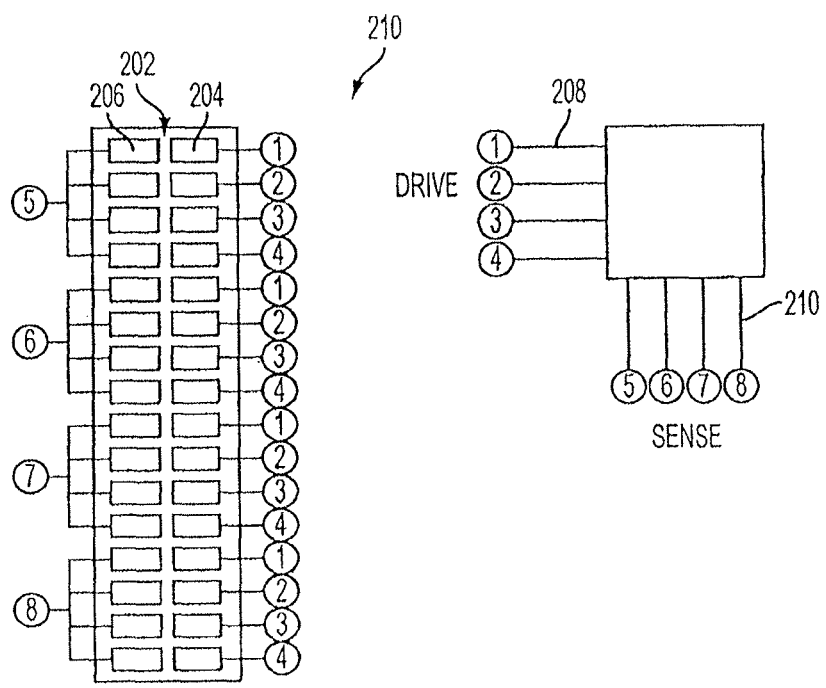
FIG. 9 illustrates an exemplary linear touch sensing device according to various embodiments.

FIG. 9 illustrates an exemplary linear touch device according to various embodiments. The linear touch device 220 can be divided into several independent and spatially distinct nodes 202 that can be positioned next to one another along a straight line. Each of the nodes 202 can represent a different linear position. Although shown vertical, it should be appreciated that the linear touch device may also be horizontal or at an angle. Moreover, although shown straight, in some cases it may be desirable to use a curved line such as one that is U shaped, S shaped, etc.

Figure 10:
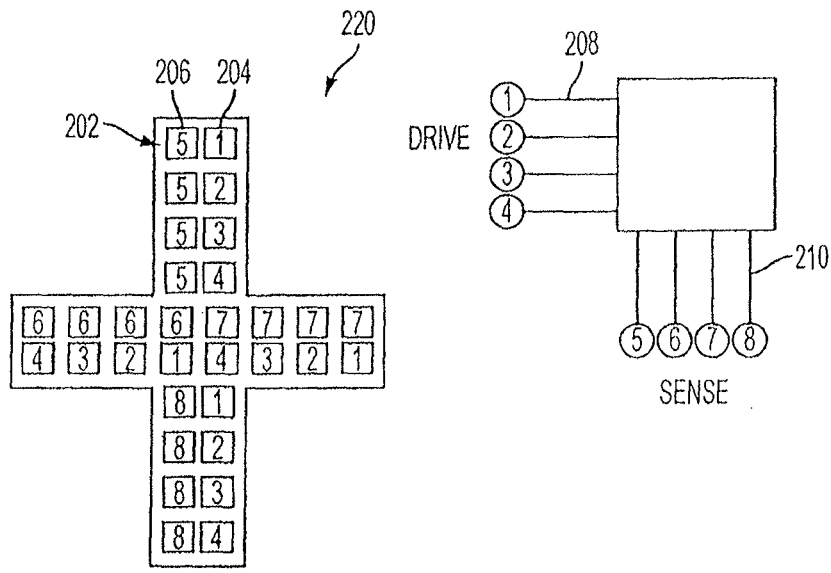
FIG. 10 illustrates another exemplary type of linear touch sensing device according to various embodiments.

FIG. 10 illustrates another exemplary type of linear touch device according to various embodiments. The linear touch device 250 can be divided into several independent and spatially distinct nodes 202 that can be positioned in the form of a "+" shape. This embodiment can include both a horizontal line and a vertical line that can cross each other.

Figure 11:
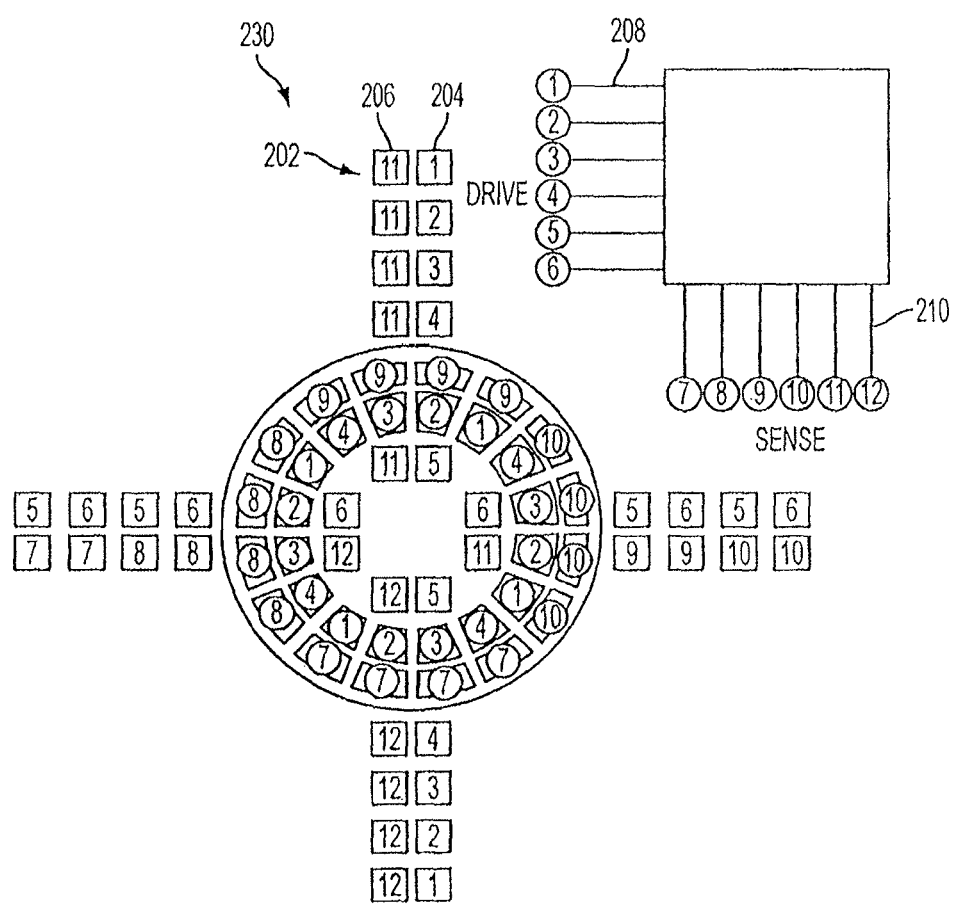
FIG. 11 illustrates an exemplary combined touch sensing device according to various embodiments.

FIG. 11 illustrates an exemplary combined touch device according to various embodiments. For example, it may combine two sets of scrolling/parameter control regions as, for example, the circular region described in FIG. 9 and the plus region described in FIG. 10.

Figure 12:
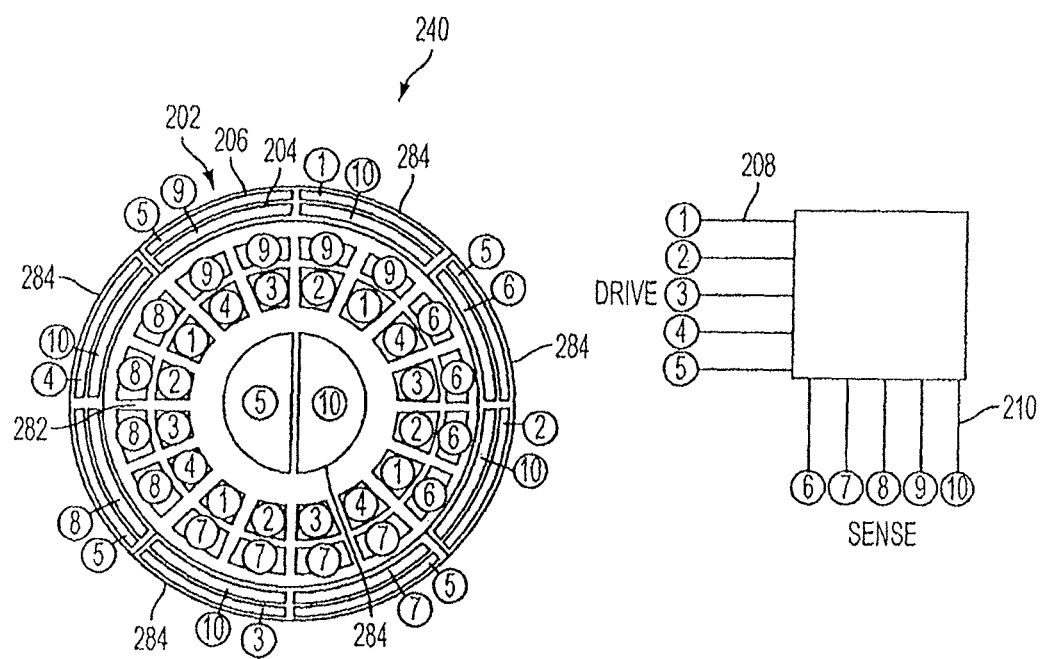
FIG. 12 illustrates an exemplary touch sensing device that includes a touch region and one or more distinct buttons according to various embodiments.
Figure 13:
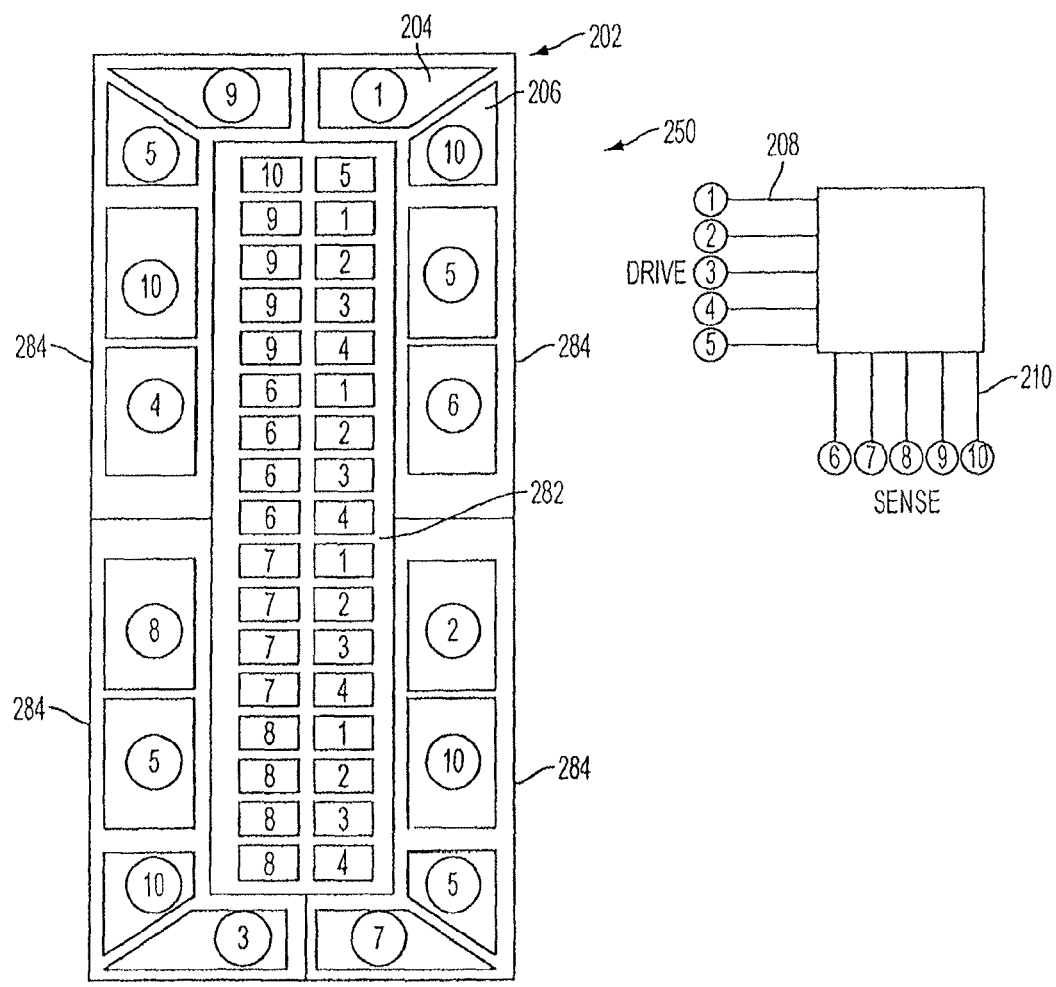
FIG. 13 illustrates another exemplary touch sensing device that includes a touch region and one or more distinct buttons according to various embodiments.
Figure 14:
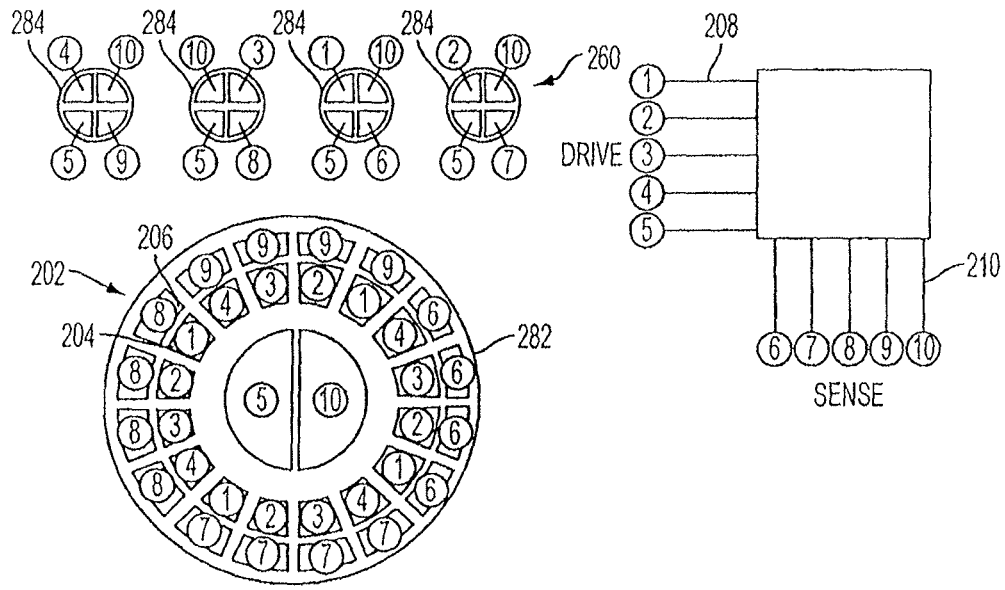
FIG. 14 illustrates still another exemplary touch sensing device that includes a touch region and one or more distinct buttons according to various embodiments.

FIGS. 12-14 illustrate exemplary touch sensing devices that can include a touch region and one or more distinct buttons according to various embodiments. The touch devices 250-270 can include a scrolling or parameter control set up 282 and one or more distinct buttons 284. The scrolling or parameter control set up 282 can include nodes 202 configured similarly to any of those previously described 200-240. The buttons 284, on the other hand, can include additional node(s) 202. Each button may include one or more nodes. The minimum required node can be one, but in some cases it may be desirable to include multiple nodes. The buttons 284 may be positioned inside and/or outside the scrolling region 282. They may be placed in close proximity of the scrolling region 282 as, for example, around the periphery of the scrolling region 282 (FIGS. 12 and 13) and/or they may be placed away from the scrolling region 282 (FIG. 14).

Figure 15:
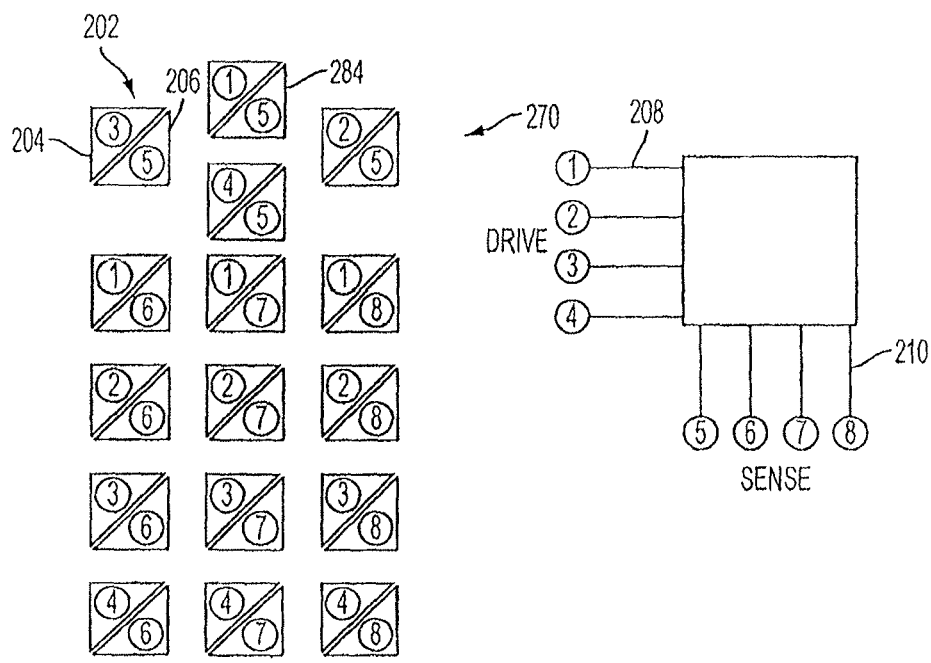
FIG. 15 illustrates an exemplary touch sensing device that only includes a button arrangement according to various embodiments.

FIG. 15 illustrates an exemplary touch sensing device that only includes a button arrangement according to various embodiments. The touch device 280 can include a button arrangement having multiple buttons 284. Each button 284 can have a different task or function assigned thereto. The buttons 284 may be arranged in any manner within a user interface of an electronic device.

Figure 16:
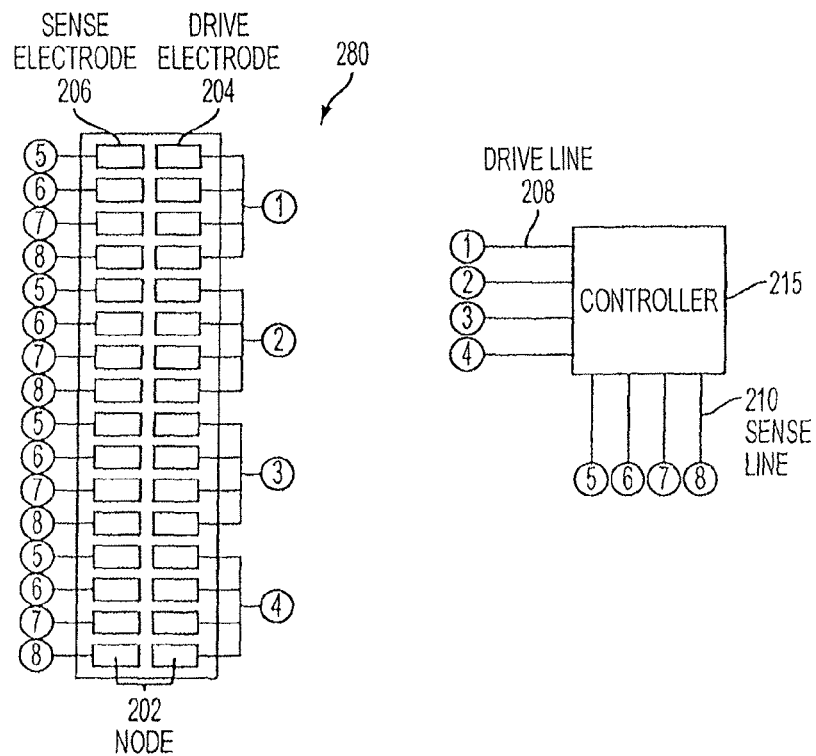
FIG. 16 illustrates another exemplary linear touch sensing device according to various embodiments.

FIG. 16 illustrates another exemplary linear touch device according to various embodiments. In the example of FIG. 16, linear touch device 280 can be similar to the linear touch device 220 of FIG. 9 with the following exceptions. Several independent and spatially distinct nodes 202 can be grouped into several node groups, where a group of adjacent drive electrodes 204 can be coupled to the same drive line 208 and corresponding adjacent sense electrodes 206 in that same group can be coupled to different sense lines 210. Each sense electrode 206 in a group can be coupled to a sense electrode in another group by the same sense line 210. As such, each node 202 can have a different combination of drive and sense lines coupled thereto. Moreover, by coupling multiple nodes to the same drive line or the same sense line, the total number of drive and sense lines can be reduced, thereby reducing the real estate needed for placing the lines. Controller 215 can operate similar to the controller 12 of FIG. 1. The controller 215 can communicate with the nodes 202 via the distinct drive lines 208 and the distinct sense lines 210, where the drive lines 208 can be configured to carry current from the controller 215 to the nodes to drive the nodes and the sense lines 210 can be configured to carry signals from the nodes to the controller indicative of a touch (or other events) at the nodes.

Figure 17:
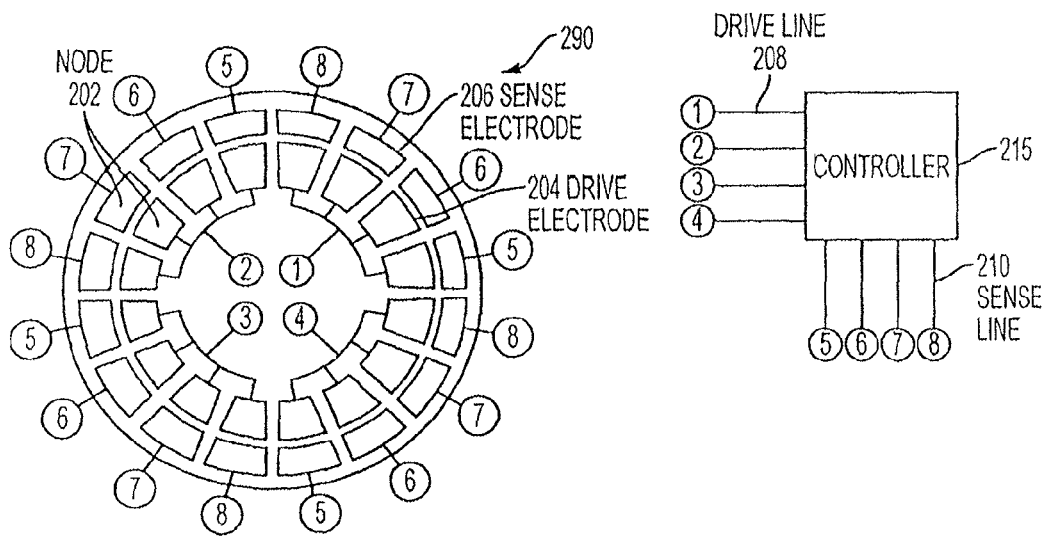
FIG. 17 illustrates another exemplary circular touch sensing device according to various embodiments.

FIG. 17 illustrates another exemplary circular touch device according to various embodiments. In the example of FIG. 17, circular touch device 290 can be similar to the circular touch device 200 of FIG. 8 with the following exceptions. Several independent and spatially distinct nodes 202 can be grouped into several node groups, where a group of adjacent drive electrodes 204 can be coupled to the same drive line 208 and corresponding adjacent sense electrodes 206 in that same group can be coupled to different sense lines 210. Each sense electrode 206 in a group can be coupled to a sense electrode in another group by the same sense line 210. As such, each node 202 can have a different combination of drive and sense lines coupled thereto. Controller 215 can communicate with the nodes 202 via the distinct drive lines 208 and the distinct sense lines 210, where the drive lines 208 can be configured to carry current from the controller 215 to the nodes to drive the nodes and the sense lines 210 can be configured to carry signals from the nodes to the controller indicative of a touch (or other events) at the nodes.

Figure 18:
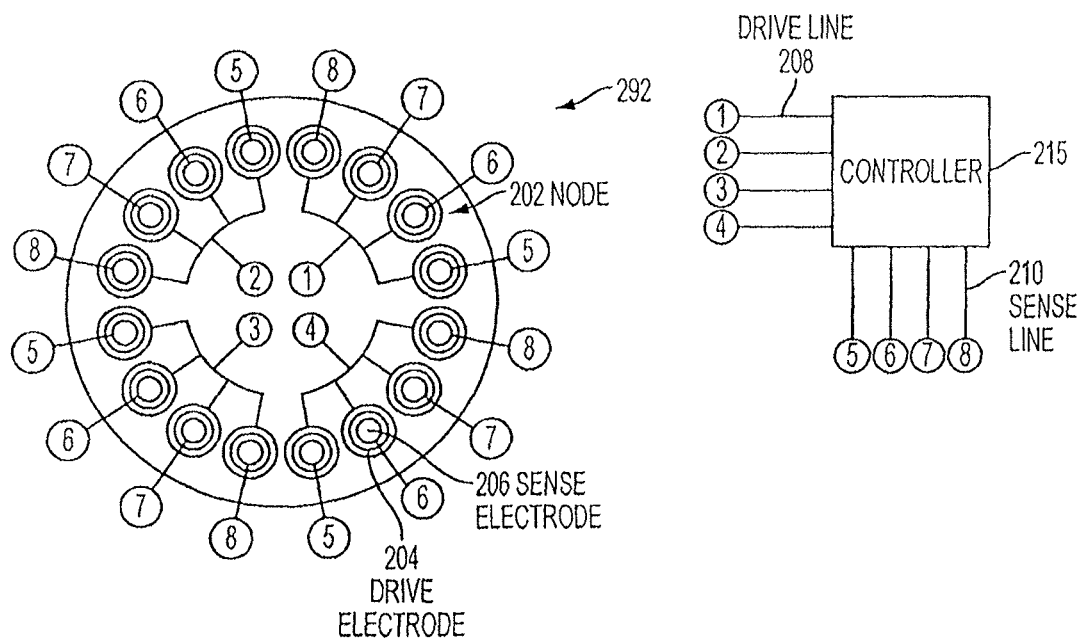
FIG. 18 illustrates still another exemplary circular touch sensing device according to various embodiments.

FIG. 18 illustrates still another exemplary circular touch device according to various embodiments. In the example of FIG. 18, circular touch device 292 can be similar to the circular touch device 290 of FIG. 17 with the following exception. Sense electrodes 206 can be surrounded by drive electrodes 204 to form nodes 202. Similar to the device 290 of FIG. 17, the nodes 202 can be grouped into several groups, where the drive electrodes 204 in a group can be coupled to the same drive line 208 and corresponding sense electrodes 206 in that same group can be coupled to different sense lines 210. Each sense electrode 206 in a group can be coupled to a sense electrode in another group by the same sense line 210. As such, each node 202 can have a different combination of drive and sense lines coupled thereto. Controller 215 can communicate with the nodes 202 via the distinct drive lines 208 and the distinct sense lines 210, where the drive lines 208 can be configured to carry current from the controller 215 to the nodes to drive the nodes and the sense lines 210 can be configured to carry signals from the nodes to the controller indicative of a touch (or other events) at the nodes.

A click wheel can include a touch sensing device as described herein so that, in addition to sensing a force applied by an object, e.g., pressing by a finger, on the wheel, the click wheel can also sense a touch by the object on the wheel, thereby performing one or more functions associated with the force, the touch, or both.

Figure 19:
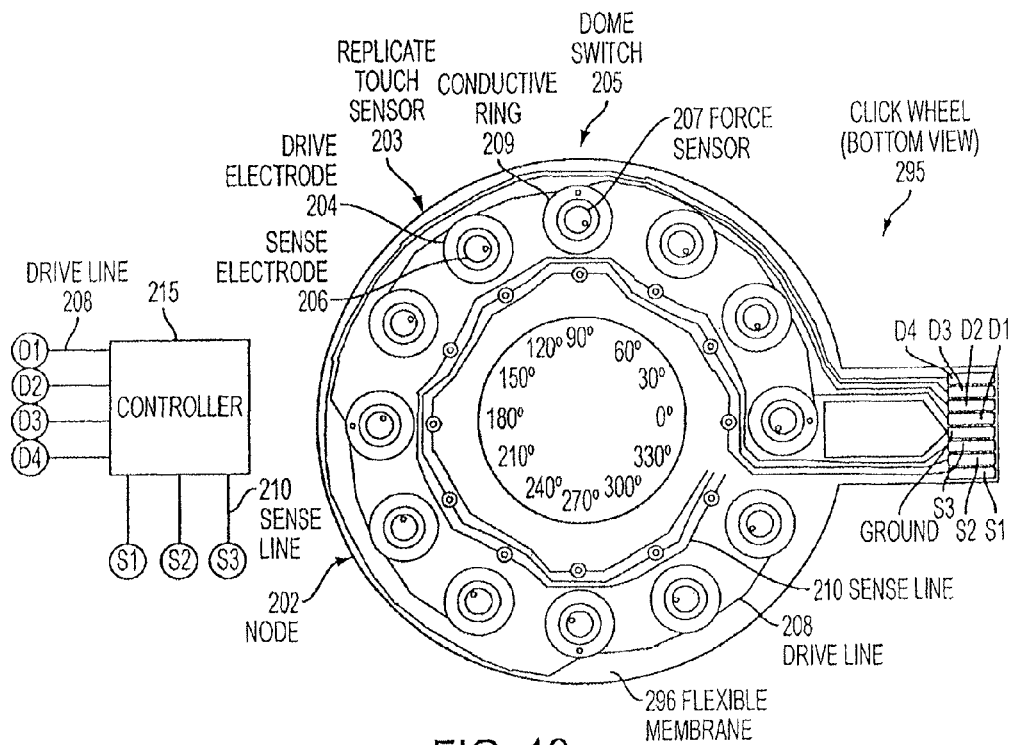
FIG. 19 illustrates an exemplary bottom view of a click wheel having touch sensing capabilities according to various embodiments.
Figure 20:
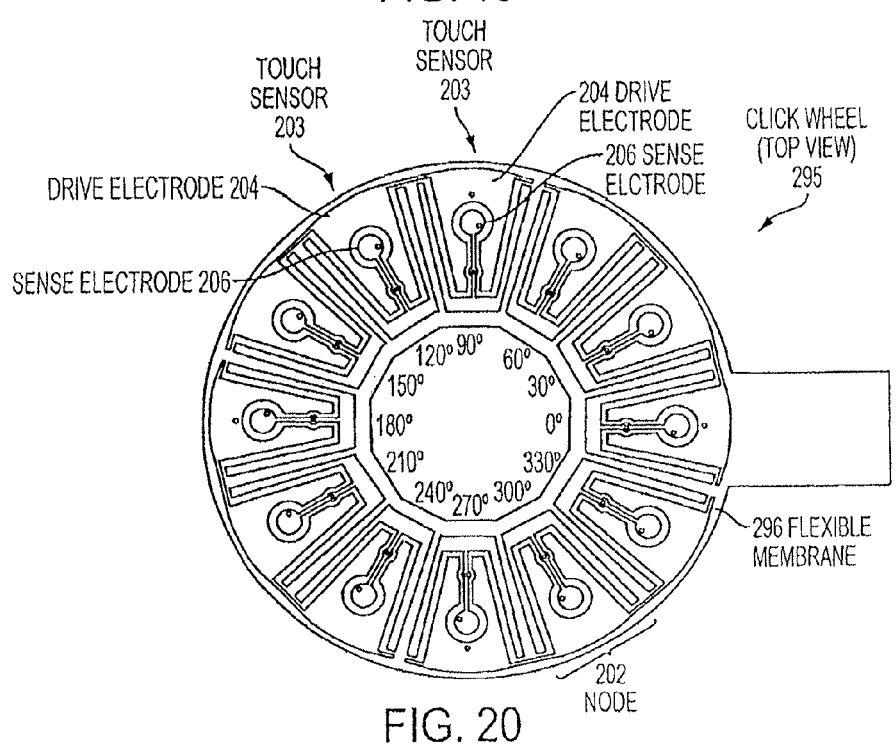
FIG. 20 illustrates an exemplary top view of a click wheel having touch sensing capabilities according to various embodiments.

FIGS. 19 and 20 illustrate exemplary bottom and top views of a click wheel having touch sensing capabilities according to various embodiments. Click wheel 295 can include flexible membrane 296 having touch and force sensing circuitry thereon. The flexible membrane 296 can be positioned beneath a click wheel cover (not shown), either disposed on or proximate to the undersurface of the cover. As such, when an object touches or presses on the click wheel cover, the touch and force sensing circuitry on the flexible membrane can sense the touch or press. The touch sensing circuitry can include touch sensors 203 configured to sense a touch at or near the click wheel, e.g., at or near the click wheel cover. The force sensing circuitry can include force sensors, e.g., dome switches 205, configured to sense a force applied to the click wheel, e.g., applied to the click wheel cover.

In some embodiments, the touch sensors 203 can be disposed on the surface of the flexible membrane 296 facing the undersurface of the click wheel cover (designated herein as the "top" surface of the membrane) in a circular pattern. In some embodiments, the dome switches 205 can be disposed on the surface of the flexible membrane 296 opposite the top surface (designated herein as the "bottom" surface of the membrane) also in a circular pattern. The dome switches 205 on the bottom surface of the membrane 296 can capacitively couple with the touch sensors 203 disposed opposite on the top surface of the membrane. To ensure the same capacitive performance for all the touch sensors 203, conductive patterns similar to those of the dome switches 205 can be replicated on the bottom surface of the membrane 296 opposite the remaining touch sensors 203. As such, the replicate conductive patterns on the bottom surface can capacitively couple with the touch sensors 203 disposed opposite on the top surface. This will be described in more detail in FIG. 19 below. Additionally, to ensure constructive interaction between the dome switches 205 and their oppositely disposed touch sensor 203, the locations of conductive components of these touch sensors can substantially match the locations of conductive components of the dome switches. Moreover, to ensure the same capacitive performance for all the touch sensors 203, conductive patterns of the touch sensors 203 disposed opposite the dome switches 205 can be replicated on the top surface of the flexible membrane 296 for the remaining touch sensors. This will be described in more detail in FIG. 20 below.

In the example of FIG. 19, the bottom surface of the flexible membrane 296 can have multiple nodes 202 disposed in a circular pattern around the membrane surface. The nodes 202 can include dome switches 205 and replicate portions of touch sensors 203. In some embodiments, the dome switches 205 can be disposed on the bottom surface of the flexible membrane 296 at the "press" locations of the click wheel 295, i.e., locations on the click wheel that an object can press or otherwise apply force in order to trigger a function associated with the click wheel. For example, the dome switches 205 can be disposed at the 0°, 90°, 180°, and 270° positions around an iPod™ click wheel coincident with the Forward, Menu, Back, and Play/Pause labels on the click wheel cover. As such, pressing the cover proximate to one of the labels can deform the underlying dome switch 205, causing the switch to generate a force signal that can trigger the function identified by that label. For example, pressing the click wheel cover at the Menu label can cause the dome switch underlying the label to deform and generate a force signal which can trigger a menu to display on a display screen in communication with the click wheel. Similarly, pressing the click wheel cover at the Play/Pause label can cause the dome switch underlying the label to deform and generate a force signal which can trigger audio and/or video to begin playing or pause playing on a player in communication with the click wheel. Each dome switch 205 can include force sensor 207 at the center of the switch to sense a force applied to the switch, e.g., by an object pressing on the switch, and conductive ring 209 surrounding the sensor to drive the switch. When an object presses on the switch 205, the dome center of the switch can deform to contact the force sensor 207, thereby forming a resistance short circuit between the conductive ring 209 and the sensor 207 and generating a force signal indicative of the resistance change caused by the press or applied force.

In some embodiments, the replicate portions of the touch sensors 203 can be disposed on the bottom surface of the flexible membrane 296 at locations between the dome switches 205. For example, portions of the touch sensors 203 can be disposed at the 30°, 60°, 120°, 150°, 210°, 240°, 300°, and 330° positions around an iPod™ click wheel. Each portion of touch sensor 203 can include a portion of sense electrode 206 at the center of the sensor to replicate the force sensor 207 of the dome switch 205 and a portion of drive electrode 204 surrounding the portion of sense electrode 206 to replicate the conductive ring 209 of the dome switch. The portion of sense electrode 206 on the bottom surface of the membrane 296 can capacitively couple with the sense electrode disposed opposite on the top surface. Similarly, the portion of drive electrode 204 disposed on the bottom surface of the membrane 296 can capacitively couple with the drive electrode disposed opposite on the top surface.

In the example of FIG. 20, the top surface of the flexible membrane 296 can have multiple nodes 202 disposed in a circular pattern around the membrane surface. The nodes 202 can include touch sensors 203. In some embodiments, the touch sensors 203 can be disposed on the top surface of the flexible membrane 296 to coincide with the dome switches 205 and the replicate portions of the touch sensors disposed opposite on the bottom surface. For example, the touch sensors can be disposed at the 0°, 30°, 60°, 90°, 120°, 150°, 180°, 210°, 240°, 270°, 300°, and 330° positions around an iPod™ click wheel. Each touch sensor 203 can include sense electrode 206 to sense a touch at or near the sensor and drive electrode 204 to drive the sensor. When an object touches at or near the sensor 203, the object can block electric fields formed between the drive electrode 204 and the sense electrode 206, thereby reducing the mutual capacitance between the electrodes and generating a touch signal, as a function of the capacitance change, indicative of the touch. A sensed touch can include a tap, a gesture, a rotational motion, a linear motion, etc., and can trigger a function associated therewith. For example, a rotational motion or a linear motion on the click wheel can trigger a scroll function for scrolling through a menu or list displayed on a display in communication with the click wheel.

Each sense electrode 206 on the top surface of the flexible membrane 296 can have a portion that can substantially match either a force sensor 207 of a dome switch 205 or a replicate portion of a sense electrode disposed opposite on the bottom surface of the membrane. Each sense electrode 206 on the top surface can also have a portion that can electrically couple to sense line 210 for transmitting a touch signal. Remaining portions of the touch sensor 203 designated for the sense electrode 206 can be filled with conductive material, such as interdigitated powder, to complete the sense area of the sensor. Each drive electrode 204 on the top surface of the flexible membrane 296 can have a portion that can substantially match either a conductive ring 209 of a dome switch 205 or a replicate portion of a drive electrode disposed opposite on the bottom surface of the membrane. Each drive electrode 204 on the top surface can also have a portion that can electrically couple to drive line 208 for driving the sensor. Remaining portions of the touch sensor 203 designated for the drive electrode 204 can be filled with conductive material, such as interdigitated powder, to complete the drive area of the sensor. This touch sensor structure can ensure constructive interaction between the dome switch components and the touch sensor components disposed opposite and can ensure the same capacitive performance for all the touch sensors.

Referring again to the example of FIG. 19, the flexible membrane 296 can also include drive lines 208 configured to drive the dome switches 205 and the touch sensors 203 and sense lines 210 configured to transmit a force signal from the dome switches or a touch signal from the touch sensors. In some embodiments, as in this example, the drive lines 208 and the sense lines 210 can be disposed on the bottom surface of the flexible membrane 296, connecting through vias to the touch sensors 203 on the top surface of the membrane. Other embodiments are also possible, such as both sets of lines 208, 210 being on the top surface of the membrane 296, portions of either or both sets being split between the top and bottom surfaces, or one set being on the top surface and the other set being on the bottom surface. The nodes 202 can be grouped together to form several groups, where at least one dome switch 205 and at least one touch sensor 203 can be included in each group. A group of adjacent drive electrodes 204 of the touch sensors 203 and conductive rings 209 of the dome switches 205 can be coupled to the same drive line 208. Corresponding adjacent sense electrodes 206 of the touch sensors 203 and force sensors 207 of the dome switches 205 in that same group can be coupled to different sense lines 210. Each sense electrode 206 of a touch sensor 203 in a group can be coupled to a sense electrode of a touch sensor in another group by the same sense line 210. Similarly, each force sensor 207 of a dome switch 205 in a group can be coupled to a force sensor of a dome switch in another group by the same sense line 210. As such, each node 202 can have a different combination of drive and sense lines coupled thereto. Moreover, by coupling multiple nodes to the same drive line or the same sense line, the total number of drive and sense lines can be reduced, thereby reducing the real estate needed for placing the lines.

Table 1 shows an example mapping of drive lines to sense lines for the dome switches and the touch sensors as shown in FIGS. 19 and 20.

TABLE 1

Drive and Sense Line Mapping

|  | Sense line S1 | Sense line S2 | Sense line S3 |
|---|---|---|---|
| Drive line D1 | Dome switch 0°<br>Touch sensor 0° | Touch sensor 30° | Touch sensor 60° |
| Drive line D2 | Dome switch 90°<br>Touch sensor 90° | Touch sensor 120° | Touch sensor 150° |
| Drive line D3 | Dome switch 180°<br>Touch sensor 180° | Touch sensor 210° | Touch sensor 240° |
| Drive line D4 | Dome switch 270°<br>Touch sensor 270° | Touch sensor 300° | Touch sensor 330° | where drive line D1 can drive the dome switch and the touch sensor opposite at the 0° location and sense line S1 can transmit the respective force signal and touch signal, drive line D1 can drive the touch sensor at the 30° location and sense line S2 can transmit the touch signal, and so on.

Controller 215 can operate similar to the controller 12 of FIG. 1. The controller 215 can communicate with the nodes 202 via the distinct drive lines 208 and the distinct sense lines 210, where the drive lines 208 can be configured to carry current from the controller 215 to the nodes to drive the nodes and the sense lines 210 can be configured to carry force and/or touch signals from the nodes to the controller 215 indicative of a touch and/or a force at the nodes.

Although the nodes can be disposed at 30° intervals around the click wheel as in this example, it is to be understood that other positions and/or intervals are also possible, depending on the needs of the click wheel.

Although the click wheel and the arrangement of the nodes thereon can be circular, it is to be understood that other shapes, configurations, and/or orientations are also possible, depending on the needs of the click wheel. For example, the click wheel can be oval or round and can be three-dimensional and the nodes can be arranged in an oval, round, square, rectangle, triangle, diamond, etc. configuration.

Figure 21:
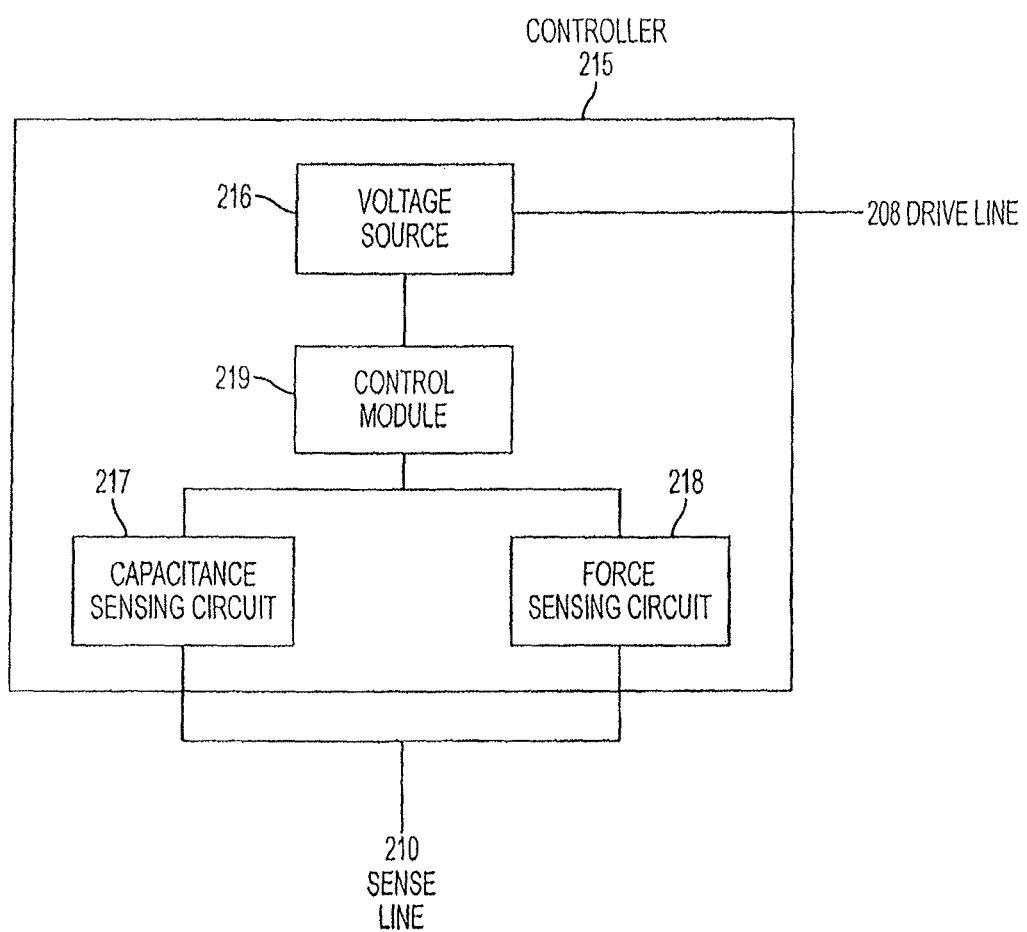
FIG. 21 illustrates an exemplary controller of a click wheel according to various embodiments.

FIG. 21 illustrates an exemplary controller of a click wheel according to various embodiments. In the example of FIG. 21, controller 215 can operate similar to the controller 12 of FIG. 1. The controller 215 can include voltage source 216, which can be coupled to drive lines 208 to drive current through each drive line 208 to drive electrodes 204 and conductive rings 209 of click wheel 295, as in FIGS. 19 and 20. The voltage source 216 can drive current through one drive line 208 at a time, through all the drive lines substantially simultaneously or somewhere in between, depending on the needs of the click wheel. The controller 215 can also include capacitance sensing circuit 217, which can be coupled to sense lines 210 to receive touch signals from the sense lines indicative of a sensed touch at touch sensors 203. The capacitance sensing circuit 217 can receive touch signals from one sense line 210 at a time, from all the sense lines substantially simultaneously, or somewhere in between, depending on the needs of the click wheel. The controller 215 can also include force sensing circuit 218, which can also be coupled to sense lines 210 to receive force signals from the sense lines indicative of a sensed force at dome switches 205. The force sensing circuit 218 can receive force signals from one sense line 210 at a time, from all the sense lines substantially simultaneously, or somewhere in between, depending on the needs of the click wheel.

Since the drive lines 208 and the sense lines 210 can be shared by the touch sensors 203 and the dome switches 205, the controller 215 can also include control module 219, which can be coupled to the various components to selectively change the operation of the click wheel between touch detection and force detection. During touch detection, the control module 219 can cause the voltage source 216 to output current through the drive lines 208 to the drive electrodes 204 of the touch sensors 203 and can cause the capacitance sensing circuit to receive touch signals from the sense electrodes 206 through the sense lines 210. During force detection, the control module 219 can cause the voltage source 216 to output current through the drive lines 208 to the conductive rings 209 of the dome switches 205 and can cause the force sensing circuit 218 to receive force signals from the force sensors 207 through the sense lines 210 when the dome switches 205 are pressed.

In some embodiments, the control module 219 can use time multiplexing when changing between touch detection and force detection. That is, the control module 219 can operate touch detection for a certain time period, then operate force detection for a certain time period, and then repeat in order to perform each operation in an effective manner. In some embodiments, the control module 219 can use interrupts when changing between touch detection and force detection. For example, the control module 219 can operate touch detection until it receives an interrupt that a dome switch 205 is about to be, is in the process of being, or has been pressed. Conversely, the control module 219 can operate force detection until it receives an interrupt that a node 202 is about to receive, is in the process of receiving, or has received a touch. Other mechanisms for changing operation of the click wheel are also possible.

Figure 22:
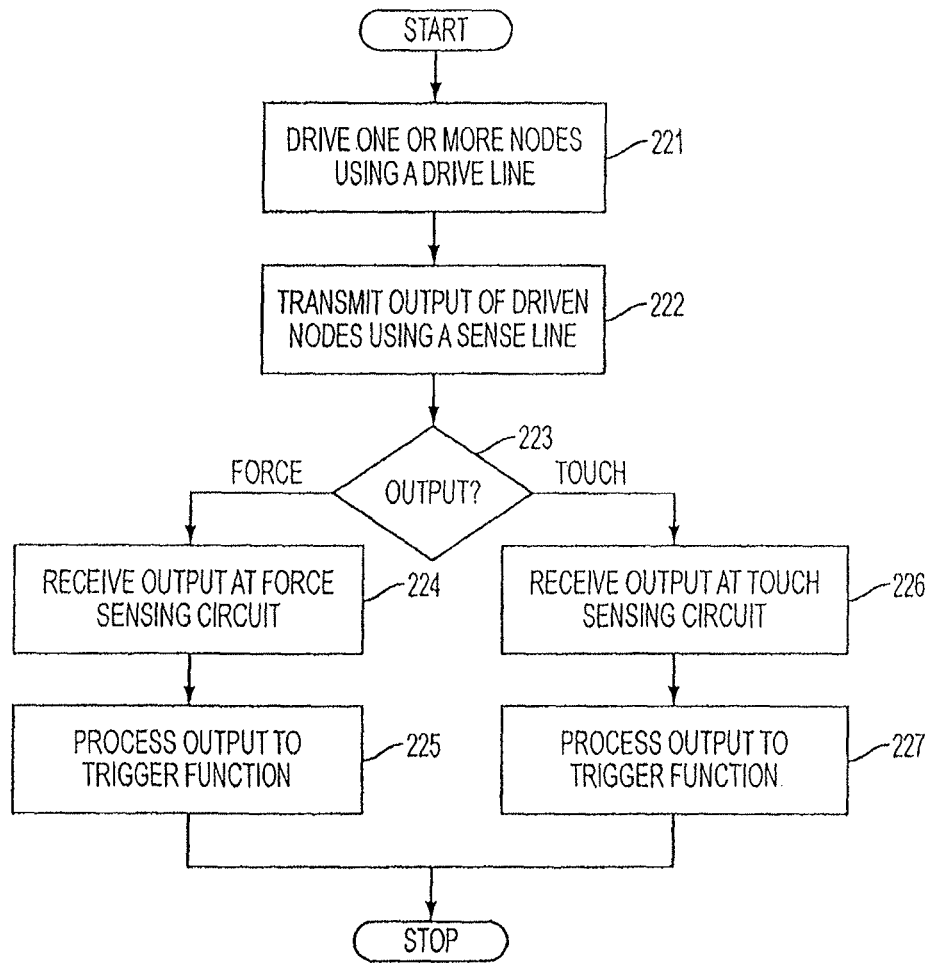
FIG. 22 illustrates an exemplary method for operating a click wheel having touch sensing capabilities according to various embodiments.

FIG. 22 illustrates an exemplary method for operating a click wheel having touch sensing capabilities according to various embodiments. In the example of FIG. 22, one or more nodes, including at least one dome switch and/or at least one touch sensor, can be driven using one or more drive lines (221). The nodes can be driven one at a time, substantially simultaneously, or somewhere in between. The sensed output of the nodes can be transmitted using one or more sense lines (222). A determination can be made as to the type of output (223). In some embodiments, the location of the node from which the signal came can be used to determine the output type. For example, if the signal came from a node at the 30° position, as in FIGS. 19 and 20, it can be determined that the signal is a touch signal since the 30° position includes only a touch sensor. In some embodiments, the sense line on which the signal was transmitted can be used to determine the output type. For example, if the signal was transmitted on sense line S2, as in FIGS. 19 and 20, it can be determined that the signal is a touch signal since only touch sensors are coupled to sense line S2. In some embodiments, the output type can be determined based on whether the click wheel is in a touch detection period or a force detection period. Other determination methods are also possible. If the output is a force signal, the force signal can be received at a force sensing circuit (224). The received force signal can be processed to trigger a function associated with the signal (225). For example, the function can be associated with the location, the strength, the timing, etc., of the force signal. If the output is a touch signal, the touch signal can be received at a touch sensing circuit (226). The received touch signal can be processed to trigger a function associated with the signal (227). For example, the function can be associated with the location, the motion, the timing, etc., of the touch signal.

It is to be understood that operation of a click wheel is not limited to the method illustrated in FIG. 22, but can include additional and/or other actions according to various embodiments.

Figure 23:
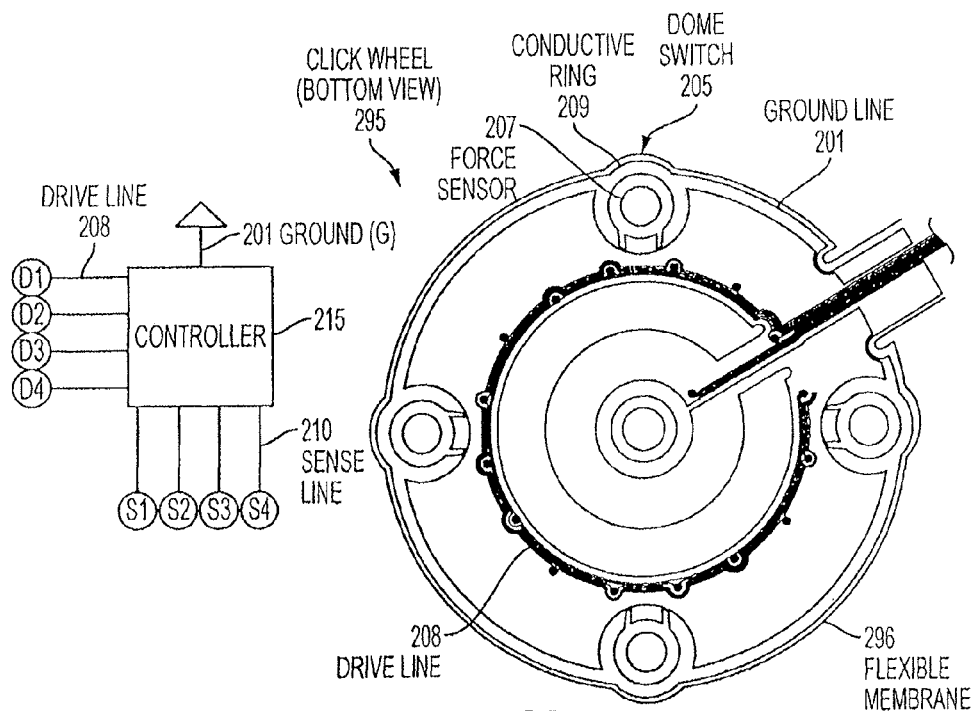
FIG. 23 illustrates another exemplary bottom view of a click wheel having touch sensing capabilities according to various embodiments.
Figure 24:
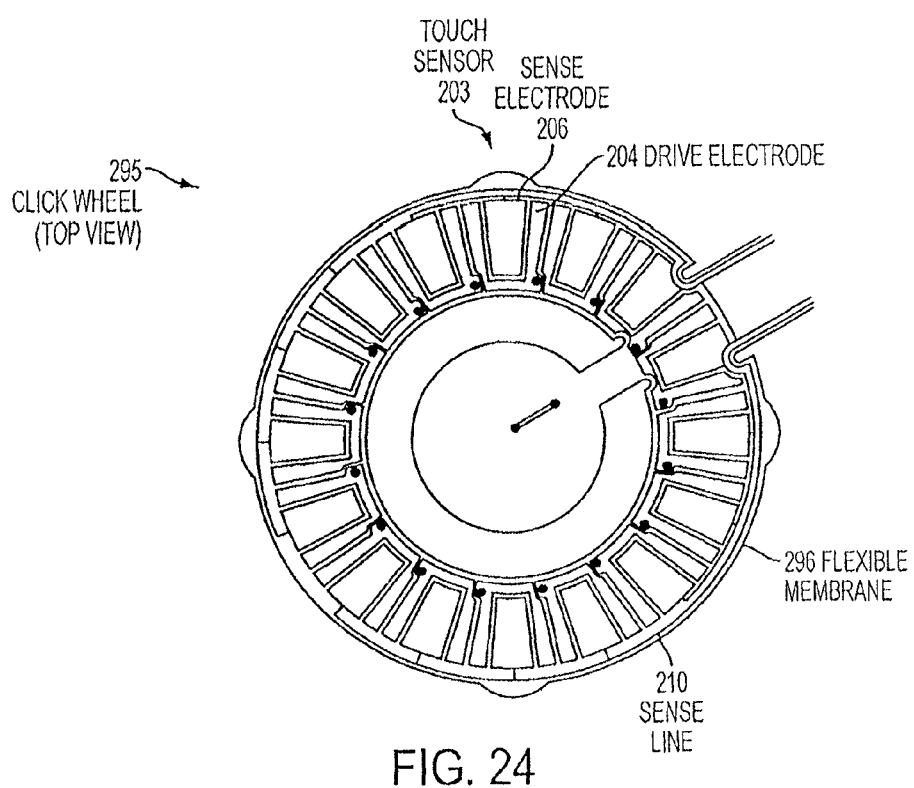
FIG. 24 illustrates another exemplary top view of a click wheel having touch sensing capabilities according to various embodiments.

FIGS. 23 and 24 illustrate exemplary bottom and top views of another click wheel having touch sensing capabilities according to various embodiments. Click wheel 295 can include flexible membrane 296 having touch and force sensing circuitry thereon. The flexible membrane 296 can be positioned beneath a click wheel cover (not shown), either disposed on or proximate to the undersurface of the cover. As such, when an object touches or presses on the click wheel cover, the touch and force sensing circuitry on the flexible membrane can sense the touch or press. The touch sensing circuitry can include touch sensors 203 configured to sense a touch at or near the click wheel, e.g., at or near the click wheel cover. The force sensing circuitry can include force sensors, e.g., dome switches 205, configured to sense a force applied to the click wheel, e.g., applied to the click wheel cover.

In the example of FIG. 23, the bottom surface of the flexible membrane 296 can have multiple nodes 202 disposed in a circular pattern around the membrane surface. The nodes 202 can include dome switches 205. In some embodiments, the dome switches 205 can be disposed on the bottom surface of the flexible membrane 296 at the "press" locations of the click wheel 295, i.e., locations on the click wheel that an object can press or apply force in order to trigger a function associated with the click wheel. For example, the dome switches 205 can be disposed at the 0°, 90°, 180°, and 270° positions around an iPod™ click wheel coincident with the Forward, Menu, Back, and Play/Pause labels on the click wheel cover. As such, as described previously, pressing the cover proximate to one of the labels can deform the underlying dome switch 205, causing the switch to generate a force signal that can trigger the function identified by that label. Each dome switch 205 can include force sensor 207 at the center of the switch to sense a force applied to the switch, e.g., by an object pressing on the switch, and conductive ring 209 surrounding the sensor to drive the switch. When an object presses on the switch 205, the dome center of the switch can deform to contact the force sensor 207, thereby forming a short circuit between the conductive ring 209 and the sensor 207 and generating a force signal indicative of the press or applied force.

In the example of FIG. 24, the top surface of the flexible membrane 296 can have multiple nodes 202 disposed in a circular pattern around the membrane surface. The nodes 202 can include touch sensors 203. In some embodiments, the touch sensors 203 can be disposed at certain intervals around the top surface of the flexible membrane 296 and some of the sensor locations can coincide with locations of the dome switches 205 on the bottom surface. For example, the touch sensors 203 can be disposed at 15° intervals around an iPod™ click wheel, where the touch sensors at positions 0°, 90°, 180°, and 270° can be disposed opposite the dome switches 205. Each touch sensor 203 can include sense electrode 206 to sense a touch at or near the sensor and drive electrode 204 to drive the sensor. When an object touches at or near the sensor 203, the object can block electric fields formed between the drive electrode 204 and the sense electrode 206, thereby reducing the mutual capacitance between the electrodes and generating a touch signal, as a function of the reduced capacitance, indicative of the touch. As described previously, a sensed touch can include a tap, a gesture, a rotational motion, a linear motion, etc., and can trigger a function associated therewith.

Since the click wheel cover is movable, it can sometimes move when not being intentionally moved by the user. In some embodiments, this incidental movement of the click wheel cover can apply a slight force to an underlying dome switch 205 at the point of movement, causing the dome of the switch to slightly deform. The slight deformation can move the dome closer to the underlying force sensor 207 without contacting the sensor and can reduce the air gap between the sensor and the dome. This gap reduction can increase the capacitance of the switch. Since the dome switch can be capacitively coupled to the touch sensor disposed opposite the switch, this increase in capacitance can induce or introduce error in the mutual capacitance measured at the touch sensor, thereby introducing error in the resultant touch signal. To reduce or avoid this error, the dome switches can be coupled to ground, as shown in FIGS. 23 and 24, rather than to drive lines, as in other embodiments. As such, the capacitance error can be shunted to ground rather than to the touch signal outputs.

Referring again to the example of FIGS. 23 and 24, the flexible membrane 296 can also include drive lines 208 configured to drive the touch sensors 203 and sense lines 210 configured to transmit a force signal from the dome switches 205 or a touch signal from the touch sensors. The nodes 202 can be grouped into several groups, where at least one dome switch 205 and at least one touch sensor 203 can be included in each group. A group of adjacent sense electrodes 206 of the touch sensors 203 and force sensors 207 of the dome switches 205 can be coupled to the same sense line 210. Corresponding adjacent drive electrodes 204 of the touch sensors 203 in that same group can be coupled to different drive lines 208. Corresponding conductive rings 209 of the dome switches 205 in that group can be coupled to ground 201 so as to avoid inducing error in the capacitance when the dome switches 205 are slightly deformed. Each drive electrode 204 of a touch sensor 203 in a group can be coupled to a drive electrode of a touch sensor in another group by the same drive line 208. As such, each node 202 can have a different combination of drive and sense lines coupled thereto. Moreover, by coupling multiple nodes to the same drive line or the same sense line, the total number of drive and sense lines can be reduced, thereby reducing the real estate needed for placing the lines.

Table 2 shows an example mapping of drive lines to sense lines to ground for the dome switches and the touch sensors as shown in FIGS. 23 and 24.

TABLE 2

Drive and Sense Line Mapping

|  | Sense line S1 | Sense line S2 | Sense line S3 | Sense line S4 |
|---|---|---|---|---|
| Drive line D1 | Touch sensor 45° | Touch sensor 135° | Touch sensor 225° | Touch sensor 315° |
| Drive line D2 | Touch sensor 67.5° | Touch sensor 157.5° | Touch sensor 247.5° | Touch sensor 337.5° |
| Drive line D3 | Touch sensor 90° | Touch sensor 180° | Touch sensor 270° | Touch sensor 0° |
| Drive line D4 | Touch sensor 112.5° | Touch sensor 202.5° | Touch sensor 292.5° | Touch sensor 22.5° |
| Ground G | Dome switch 90° | Dome switch 180° | Dome switch 270° | Dome switch 0° | where sense line S1 can couple to the touch sensor and the dome switch at 90° location, but the touch sensor can couple to drive line D3 while the dome switch can couple to ground G, and so on.

Controller 215 can operate similar to the controller 12 of FIG. 1. The controller 215 can communicate with the nodes 202 via the distinct drive lines 208 and the distinct sense lines 210, where the drive lines 208 can be configured to carry current from the controller 215 to the nodes to drive the nodes and the sense lines 210 can be configured to carry force and/or touch signals from the nodes to the controller 215 indicative of a touch and/or a force at the nodes. The nodes 202 can also connect to ground 201.

Although the nodes can be disposed at 15° intervals around the click wheel as in this example, it is to be understood that other positions and/or intervals are also possible, depending on the needs of the click wheel.

Although the click wheel and the arrangement of the nodes thereon can be circular, it is to be understood that other shapes, configurations, and/or orientations are also possible, depending on the needs of the click wheel. For example, the click wheel can be oval or round and can be three-dimensional and the nodes can be arranged in an oval, round, square, rectangle, triangle, diamond, etc. configuration.

In an alternate embodiment, similar to the click wheel of FIGS. 19 and 20, the sense electrodes and the drive electrodes of the touch sensors of FIG. 24 opposite the dome switches can be configured to substantially match the force sensors and conductive rings of the dome switches to provide constructive interaction therebetween. Additionally, the touch sensor conductive patterns can be substantially the same to provide substantially the same capacitive performance. Also, conductive patterns replicating the dome switches can be disposed on the bottom surface of the membrane opposite the touch sensors to provide substantially uniform capacitive performance of all the touch sensors.

Also, in an alternate embodiment, similar to the click wheel of FIGS. 19 and 20, a group of adjacent touch sensors of FIGS. 23 and 24 can be coupled to the same drive line and to different sense lines and each touch sensor in a group can be coupled to a touch sensor in another group by the same sense line. Additionally, the dome switches can be coupled to ground and to the same sense line.

Figure 25:
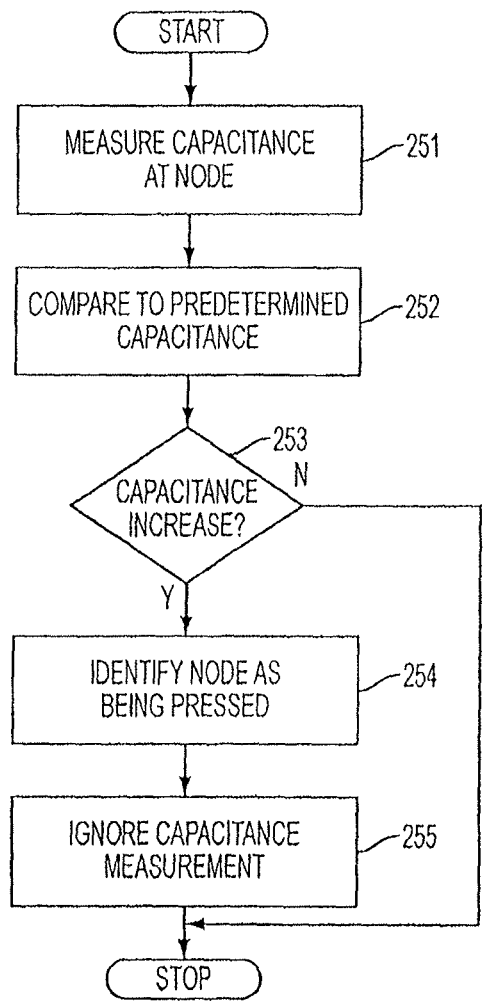
FIG. 25 illustrates an exemplary method for detecting capacitance error in a click wheel according to various embodiments.

FIG. 25 illustrates an exemplary method for detecting capacitance error in a click wheel according to various embodiments. In the example of FIG. 25, mutual capacitance at a touch sensor can be measured (251). The measured capacitance can be compared to a predetermined capacitance value (252). The predetermined capacitance value can be a typical or expected capacitance measurement based on an object touch profile, operation, design, etc., of the click wheel. A determination can be made whether the comparison indicates a capacitance increase of the measured capacitance value above the predetermined capacitance value (253). If so, this increase can indicate an induced error in the capacitance measurement due to a dome switch being pressed. Accordingly, the dome switch can be identified as being pressed or having a force applied thereto (254). And the measured capacitance can be ignored (255). In some embodiments, a signal can be sent to a controller indicating that the dome switch is being pressed. If the comparison indicates a capacitance decrease of the measured capacitance value below the predetermined capacitance value, this can indicate a normal touch at the touch sensor, which can be sent to the controller for further processing.

It is to be understood that capacitance error detection is not limited to the method illustrated in FIG. 25, but can include additional and/or other actions according to various embodiments.

Figure 26:
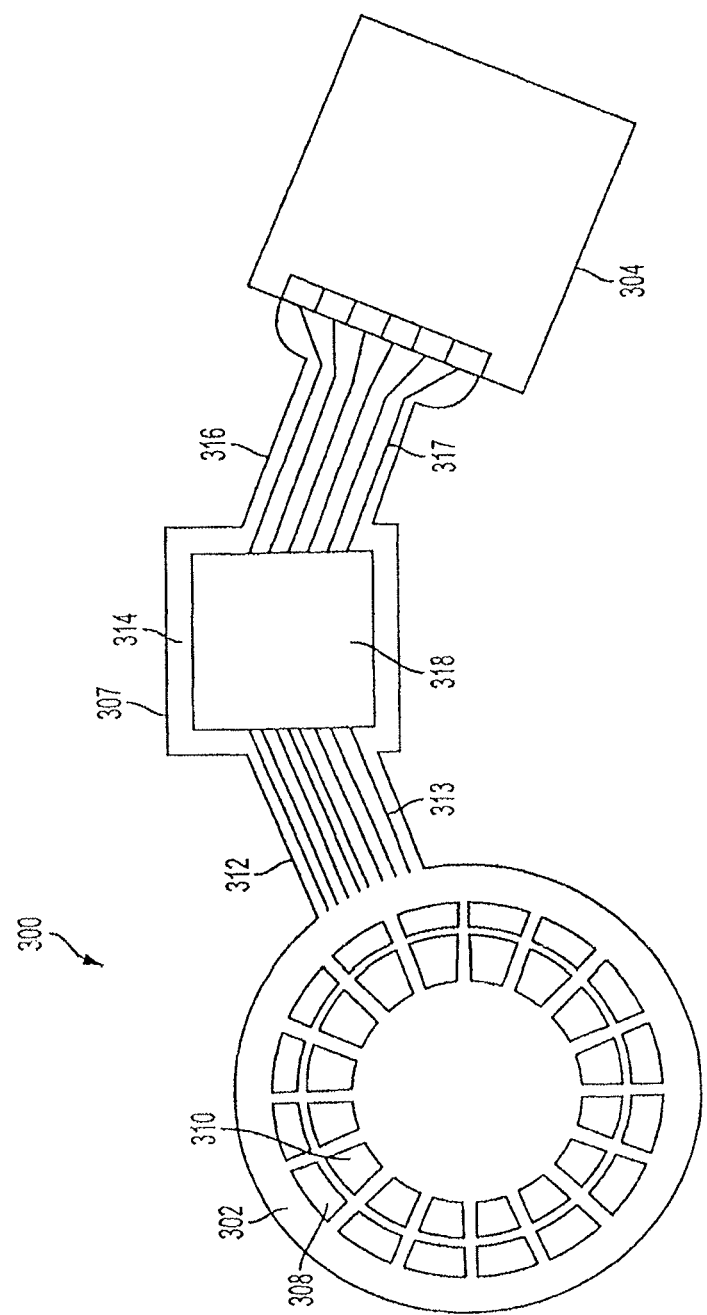
FIG. 26 illustrates an exemplary touch assembly according to various embodiments.

FIG. 26 illustrates an exemplary touch assembly according to various embodiments. The touch assembly 300 can include multiple mutual capacitive sensing nodes 302 coupled to a host controller 304 via flex circuit 306. The nodes 302 may be disposed on the flexible member of the flex circuit 306 or alternatively on a printed circuit board that can be attached to the flexible member of the flex circuit. The nodes 302 can include a drive electrode 308 and a sense electrode 310 as described above. Although the nodes and electrodes can be arranged in accordance with any of the embodiments described above, in the illustrated embodiment the nodes and electrodes can be set up similarly to FIG. 8.

The flexible member 307 of the flex circuit 306 can include a first neck 312, a landing area 314 and a second neck 316. The first neck 312 can include multiple traces 313 coupling the I/O contacts of the nodes 302 to corresponding I/O contacts of an input controller 318 disposed on the landing area 314 of the flex circuit 306. The input controller 318 may for example include a capacitive sensing microprocessor. In order to reduce the number of traces and I/O contacts of the input controller, the drive and sense electrodes of the nodes may be configured to share the traces that couple back to the I/O contacts of the input controller. Furthermore, in order to allow sensing, each node may include a different arrangement of drive and sense trace coupled to their corresponding electrodes. In one embodiment, the number of traces and thus the number of I/O contacts can be less than the number nodes 302. In one implementation of this embodiment, the number of traces and thus the number of I/O contacts of the input controller can be equal to the square root of the number of nodes 302. This can be in contrast to a self capacitive device where there can typically be one trace for each electrode as well as one for ground. (e.g., in the case of a sixteen electrodes, there would be seventeen traces on the first neck 312). Additional traces may be provided for other input means as for example mechanical buttons, switches, etc.

The second neck 316 can include multiple traces 317 coupling the I/O contacts of the input controller 318 to corresponding I/O contacts of the host controller 304. The number of lines can typically depend on the communication protocol being used. By way of example, the second neck 316 may include six traces 317 for power and serial data (e.g., USB). In some cases, the flex circuit 306 can be connected to the host controller 304 through a connector arrangement that can utilize pins or contacts (e.g., male/female). In this way, the touch sensing unit 302 and flex circuit 306 can be a separate unit that can couple to and decouple from the host controller 304 thereby making assembly easier. In other cases, they can be permanently attached thereby creating a single unit. The host controller 304 may be positioned on the flexible member of the flex circuit or alternatively on a printed circuit board such as the main board of the electronic device.

Figure 27:
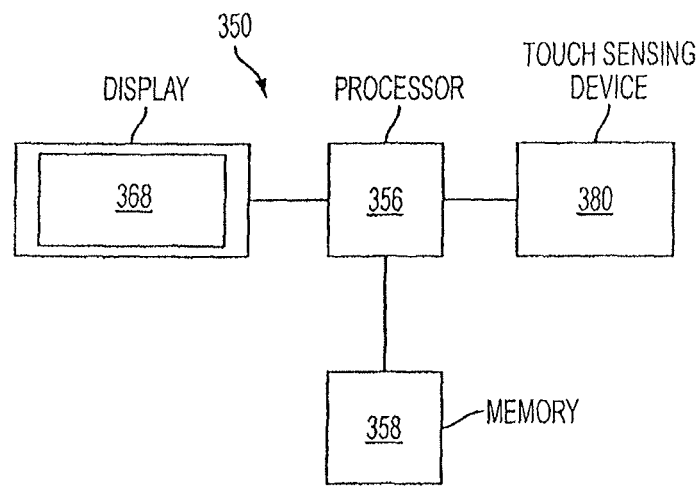
FIG. 27 illustrates an exemplary electronic device according to various embodiments.

FIG. 27 illustrates an exemplary electronic device according to various embodiments. The electronic device 350 can typically include a processor 356 configured to execute instructions and to carry out operations associated with the electronic device. For example, using instructions retrieved for example from memory, the processor 356 may control the reception and manipulation of input and output data between components of the electronic device 350. The processor 356 can be implemented on a single-chip, multiple chips or multiple electrical components. For example, various architectures can be used for the processor 356, including dedicated or embedded processor, single purpose processor, controller, ASIC, and so forth.

In most cases, the processor 356 together with an operating system can operate to execute computer code and produce and use data. The operating system may correspond to well known operating systems such as OSX, DOS, Unix, Linux, and Palm OS, or alternatively to special purpose operating system, such as those used for limited purpose appliance-type devices (e.g., media players). The operating system, other computer code and data may reside within a memory block 358 that can be operatively coupled to the processor 56. Memory block 358 can generally provide a place to store computer code and data that can be used by the electronic device 350. By way of example, the memory block 58 may include Read-Only Memory (ROM), Random-Access Memory (RAM), hard disk drive, flash memory and/or the like.

The electronic device 350 can also include a display 368 that can be operatively coupled to the processor 356. The display 368 can be generally configured to display a graphical user interface (GUI) that can provide an easy to use interface between a user of the electronic device 350 and the operating system or application running thereon. The display 368 may for example be a liquid crystal display (LCD).

The electronic device 350 can also include one or more touch sensing devices 380 that can utilize the mutual capacitive sensing technology described herein. The one or more touch sensing devices can be operatively coupled to the processor 356. The touch sensing devices 380 can be configured to transfer data from the outside world into the electronic device 350. The touch sensing device 380 may for example be used to perform movements such as scrolling and to make selections with respect to the GUI on the display 368. The touch sensing device 380 may also be used to issue commands in the electronic device 350. The touch sensing devices may be selected from fixed and/or movable touch pads, touch screens and/or touch sensitive housings.

The touch sensing device 380 can recognize touches, as well as the position and magnitude of touches on a touch sensitive surface. The touch sensing device 380 can report the touches to the processor 356 and the processor 356 can interpret the touches in accordance with its programming. For example, the processor 356 may initiate a task in accordance with a particular touch. Alternatively, a dedicated processor can be used to process touches locally at the touch sensing device and reduce demand for the main processor of the electronic device.

In one particular embodiment, the electronic devices described above can correspond to hand-held electronic devices with small form factors. As used herein, the term "hand held" means that the electronic device can typically be operated while being held in a hand and thus the device can be sized and dimensioned for such use. Examples of hand held devices can include PDAs, mobile (or cellular) telephones, media players (e.g., music players, video players, and game players), cameras, GPS receivers, remote controls, and the like.

As should be appreciated, the touch sensing device can reduce the number of input devices needed to support the device and in many cases completely eliminate input devices other than the touch sensing devices. The device can therefore be more aesthetically pleasing (e.g., planar smooth surfaces with limited to no breaks gaps or lines), and in many cases can be made smaller without sacrificing screen size and input functionality, which can be very beneficial for hand held electronic device especially those hand held electronic device that can be operated using one hand (some hand held electronic device may require two handed operation while others may not).

The touch sensing devices of the various embodiments can be a perfect fit for small form factor devices such as hand held devices, which can have limited space available for input interfaces, and which can require adaptable placement of input interfaces to permit operation while being carried around. This can be especially true when you consider that the functionality of handheld devices has begun to merge into a single hand held device. At some point, there may not be enough real estate on the device for housing all the necessary buttons and switches without decreasing the size of the display or increasing the size of the device, both of which can leave a negative impression on the user. In fact, increasing the size of the device may lead to devices, which can no longer be considered "hand-held."

In one particular implementation, the hand held device can be a music player and the touch sensing device can be configured to generate control signals associated with a music player. For example, the touch sensing device may include list scrolling functionality, volume control functionality and button functionality including, Select, Play/Pause, Next, Previous and Menu. In another particular implementation, the hand held device can be a mobile telephone and the touch sensing device can be configured to generate control signals associated with the mobile telephone. For example, the touch sensing device may include call list scrolling functionality, volume control functionality, call button functionality including alphanumeric inputs, Select, Menu, Talk, End, Speaker, and Redial.

The touch sensing devices of the various embodiments can also be a perfect fit for small form factor device such as portable devices. In one particular implementation, the portable device can be a personal computer and the touch sensing device can be configured to generate control signals associated with the personal computer. For example, the touch sensing device may include scrolling, selecting, and moving functionality.

Figure 28:
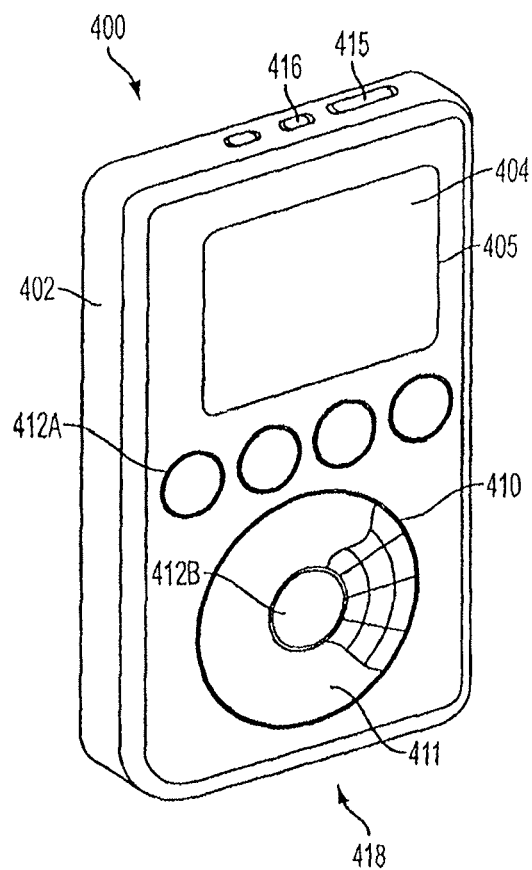
FIG. 28 illustrates an exemplary digital media player according to various embodiments.

FIG. 28 illustrates an exemplary digital media player according to various embodiments. The term "media player" generally refers to computing devices that can be dedicated to processing media such as audio, video or other images, as for example, music players, game players, video players, video recorders, cameras and the like. These devices can be generally portable so as to allow a user to listen to music, play games or video, record video or take pictures wherever the user travels. In one embodiment, the media player can be a handheld device that can be sized for placement into a pocket of the user. By the handheld device being pocket sized, the user may not have to directly carry the device and therefore the device can be taken almost anywhere the user travels (e.g., the user may not be limited by carrying a large, bulky and often heavy device, as in a portable computer).

Media players can generally have connection capabilities that can allow a user to upload and download data to and from a host device such as a general purpose computer (e.g., desktop computer, portable computer). For example, in the case of a camera, photo images may be downloaded to the general purpose computer for further processing (e.g., printing). With regards to music players, songs and play lists stored on the general purpose computer may be downloaded into the music player. In the illustrated embodiment, the media player 400 can be a pocket sized hand held MP3 music player that can allow a user to store a large collection of music. By way of example, the MP3 music player may correspond to any of those iPod™ music players manufactured by Apple Computer of Cupertino, Calif. (e.g., standard, mini, iShuffle™, Nano™, etc.).

As shown in FIG. 28, the media player 400 can include a housing 402 that can enclose internally various electrical components (including integrated circuit chips and other circuitry) to provide computing operations for the media player 400. The integrated circuit chips and other circuitry may include a microprocessor, memory (e.g., ROM, RAM), a power supply (e.g., battery), a circuit board, a hard drive, and various input/output (I/O) support circuitry. In the case of music players, the electrical components may include components for outputting music such as an amplifier and a digital signal processor (DSP). In the case of video recorders or cameras the electrical components may include components for capturing images such as image sensors (e.g., charge coupled device (CCD) or complimentary oxide semiconductor (CMOS)) or optics (e.g., lenses, splitters, filters). In addition to the above, the housing may also define the shape or form of the media player. That is, the contour of the housing 402 may embody the outward physical appearance of the media player 400.

The media player 400 can also include a display screen 404. The display screen 404 can be used to display a graphical user interface as well as other information to the user (e.g., text, objects, or graphics). By way of example, the display screen 404 may be a liquid crystal display (LCD). As shown, the display screen 404 can be visible to a user of the media player 400 through an opening 405 in the housing 402, and through a transparent wall 406 that can be disposed in front of the opening 405. Although transparent, the transparent wall 406 may be considered part of the housing 402 since it can help to define the shape or form of the media player 400.

The media player 400 can also include a touch pad 410. The touch pad 410 can be configured to provide one or more control functions for controlling various applications associated with the media player 400. For example, the touch initiated control function may be used to move an object or perform an action on the display screen 404 or to make selections or issue commands associated with operating the media player 400. In most cases, the touch pad 410 can be arranged to receive input from a finger moving across the surface of the touch pad 110 in order to implement the touch initiated control function.

The manner in which the touch pad 410 receives input may be widely varied. In one embodiment, the touch pad 410 can be configured to receive input from a linear finger motion. In another embodiment, the touch pad 410 can be configured to receive input from a rotary or swirling finger motion. In yet another embodiment, the touch pad 410 can be configured to receive input from a radial finger motion. Additionally or alternatively, the touch pad 410 may be arranged to receive input from a finger tapping on the touch pad 410. By way of example, the tapping finger may initiate a control function for playing a song, opening a menu and the like.

In one embodiment, the control function can correspond to a scrolling feature. For example, in the case of an MP3 player, the moving finger may initiate a control function for scrolling through a song menu displayed on the display screen 404. The term "scrolling" as used herein can generally pertain to moving displayed data or images (e.g., text or graphics) across a viewing area on a display screen 404 so that a new set of data (e.g., line of text or graphics) can be brought into view in the viewing area. In most cases, once the viewing area is full, each new set of data can appear at the edge of the viewing area and all other sets of data can move over one position. That is, the new set of data can appear for each set of data that moves out of the viewing area. In essence, the scrolling function can allow a user to view consecutive sets of data currently outside of the viewing area. The viewing area may be the entire viewing area of the display screen 404 or it may only be a portion of the display screen 404 (e.g., a window frame).

The direction of scrolling may be widely varied. For example, scrolling may be implemented vertically (up or down) or horizontally (left or right). In the case of vertical scrolling, when a user scrolls down, each new set of data can appear at the bottom of the viewing area and all other sets of data can move up one position. If the viewing area is full, the top set of data can move out of the viewing area. Similarly, when a user scrolls up, each new set of data can appear at the top of the viewing area and all other sets of data can move down one position. If the viewing area is full, the bottom set of data can move out of the viewing area. In one implementation, the scrolling feature may be used to move a Graphical User Interface (GUI) vertically (up and down), or horizontally (left and right) in order to bring more data into view on a display screen. By way of example, in the case of an MP3 player, the scrolling feature may be used to help browse through songs stored in the MP3 player. The direction that the finger moves may be arranged to control the direction of scrolling. For example, the touch pad may be arranged to move the GUI vertically up when the finger is moved in a first direction and vertically down when the finger is moved in a second direction To elaborate, the display screen 404, during operation, may display a list of media items (e.g., songs). A user of the media player 400 may be able to linearly scroll through the list of media items by moving his or her finger across the touch pad 410. As the finger moves around the touch pad 410, the displayed items from the list of media items can be varied such that the user may be able to effectively scroll through the list of media items. However, since the list of media items can be rather lengthy, the various embodiments can provide the ability for the user to rapidly traverse (or scroll) through the list of media items. In effect, the user may be able to accelerate traversal of the list of media items by moving his or her finger at greater speeds.

In one embodiment, the media player 400 via the touch pad 410 can be configured to transform a swirling or whirling motion of a finger into translational or linear motion, as in scrolling, on the display screen 404. In this embodiment, the touch pad 410 can be configured to determine the angular location, direction, speed and acceleration of the finger when the finger is moved across the top planar surface of the touch pad 410 in a rotating manner, and to transform this information into signals that can initiate linear scrolling on the display screen 404. In another embodiment, the media player 400 via the touch pad 410 can be configured to transform radial motion of a finger into translational or linear motion, as in scrolling, on the display screen 404. In this embodiment, the touch pad 410 can be configured to determine the radial location, direction, speed and acceleration of the finger when the finger is moved across the top planar surface of the touch pad 410 in a radial manner, and to transform this information into signals that can initiate linear scrolling on the display screen 404. In another embodiment, the media player 400 via the touch pad 410 can be configured to transform both angular and radial motion of a finger into translational or linear motion, as in scrolling, on the display screen 404.

The touch pad can generally include a touchable outer surface 411 for receiving a finger for manipulation on the touch pad 410. Although not shown in FIG. 28, beneath the touchable outer surface 411 can be a sensor arrangement. The sensor arrangement can include multiple sensors that can be configured to activate as the finger performs an action over them. In the simplest case, an electrical signal can be produced each time the finger passes a sensor. The number of produced signals in a given time frame may indicate location, direction, speed and acceleration of the finger on the touch pad, i.e., the more signals, the more the user moved his or her finger. In most cases, the signals can be monitored by an electronic interface that can convert the number, combination and frequency of the signals into location, direction, speed, and acceleration information. This information may then be used by the media player 400 to perform the desired control function on the display screen 404. By way of example, the sensor arrangement may correspond to any of those described herein.

The position of the touch pad 410 relative to the housing 402 may be widely varied. For example, the touch pad 410 may be placed at any external surface (e.g., top, side, front, or back) of the housing 402 that can be accessible to a user during manipulation of the media player 400. In most cases, the touch sensitive surface 411 of the touch pad 410 can be completely exposed to the user. In the illustrated embodiment, the touch pad 410 can be located in a lower, front area of the housing 402. Furthermore, the touch pad 410 may be recessed below, level with, or extend above the surface of the housing 402. In the illustrated embodiment, the touch sensitive surface 411 of the touch pad 410 can be substantially flush with the external surface of the housing 402.

The shape of the touch pad 410 may also be widely varied. For example, the touch pad 410 may be circular, rectangular, triangular, and the like. In general, the outer perimeter of the shaped touch pad can define the working boundary of the touch pad. In the illustrated embodiment, the touch pad 410 can be circular. Circular touch pads can allow a user to continuously swirl a finger in a free manner, i.e., the finger can be rotated through 360 degrees of rotation without stopping. Furthermore, the user can rotate his or her finger tangentially from all sides thus giving it more range of finger positions. For example, when the media player is being held, a left handed user may choose to use one portion of the touch pad 410 while a right handed user may choose to use another portion of the touch pad 410. More particularly, the touch pad can be annular, i.e., shaped like or forming a ring. When annular, the inner and outer perimeter of the shaped touch pad can define the working boundary of the touch pad.

In addition to above, the media player 400 may also include one or more buttons 412. The buttons 412 can be configured to provide one or more dedicated control functions for making selections or issuing commands associated with operating the media player 400. By way of example, in the case of an MP3 music player, the button functions may be associated with opening a menu, playing a song, fast forwarding a song, seeking through a menu and the like. The button functions can be implemented via a mechanical clicking action or alternatively via a sensor arrangement such as those described herein. The position of the buttons 412 relative to the touch pad 410 may be widely varied. For example, they may be adjacent one another or spaced apart. In the illustrated embodiment, the buttons 412 can be separated from the touch pad 410 (see for example FIG. 14). As shown, there can be four buttons 412A in a side by side relationship above the touch pad 410 and one button 412B disposed in the center or middle of the touch pad 410. By way of example, multiple buttons 412 may include a menu button, play/stop button, forward seek button and a reverse seek button, select button (enter) and the like. Alternatively or additionally, the buttons may be implemented with a movable touch pad.

Moreover, the media player 400 may also include a hold switch 414, a headphone jack 416 and a data port 418. The hold switch 414 can be configured to turn the input devices of the media device 400 on and off. The headphone jack 416 can be capable of receiving a headphone connector associated with headphones configured for listening to sound being outputted by the media device 400. The data port 418 can be capable of receiving a data connector/cable assembly configured for transmitting and receiving data to and from a host device such as a general purpose computer. By way of example, the data port 418 may be used to upload or down load songs to and from the media device 400. The data port 418 may be widely varied. For example, the data port may be a PS/2 port, a serial port, a parallel port, a USB port, a Firewire port and the like. In some cases, the data port 118 may be a radio frequency (RF) link or optical infrared (IR) link to eliminate the need for a cable. Although not shown in FIG. 28, the media player 400 may also include a power port that receives a power connector/cable assembly configured for delivering powering to the media player 400. In some cases, the data port 418 may serve as both a data and power port.

Figure 29:
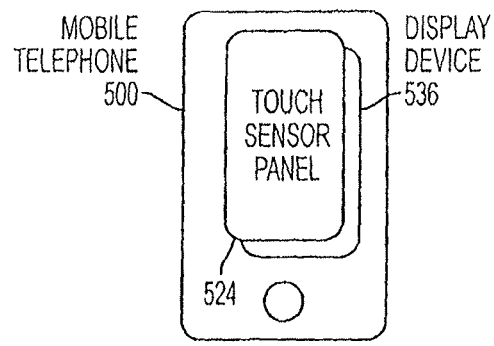
FIG. 29 illustrates an exemplary mobile telephone according to various embodiments.

FIG. 29 illustrates an exemplary mobile telephone 500 that can include touch sensor panel 524, display 536; and other computing system blocks according to various embodiments.

Figure 30:
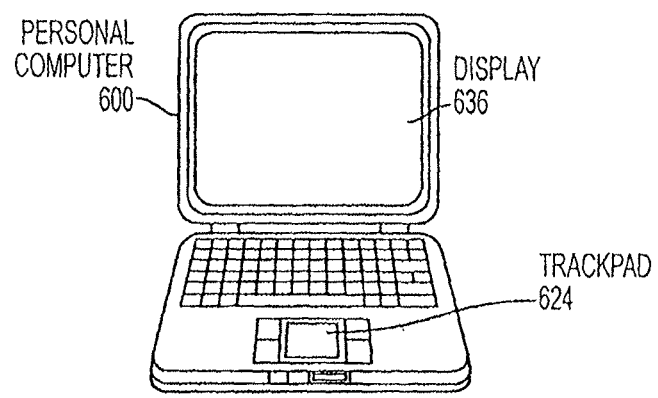
FIG. 30 illustrates an exemplary personal computer according to various embodiments.

FIG. 30 illustrates an exemplary personal computer 600 that can include touch sensor panel (trackpad) 624, display 636, and other computing system blocks according to various embodiments.

The digital media player, mobile telephone, and personal computer of FIGS. 28 through 30 can realize space savings, power savings, improved performance, and more robustness according to various embodiments.

In any of the embodiments described or contemplated herein, the touch sensing devices may be configured to provide visual information to indicate when and where the touches occur, to invoke a touch (location where a user should touch), or as otherwise programmed. In the case of a touch screen, the visual information may be provided by the graphical display positioned behind the touch screen. In the case of the touch sensitive housing, or touch pad (or possibly with the touch screen), this may be accomplished with a visual feedback system that is capable of adjusting the visual stimuli of the touch surface.

The visual feedback system may include visual surface changing elements, which can be separate or integral with the sensing elements. In fact, the visual surface changing elements may be mapped to the sensor coordinates such that particular visual surface changing elements are tied to particular sensor coordinates. By way of example, the visual surface changing elements may be light devices such as light emitting diodes that illuminate the touch surface. For example, the light devices may be positioned in an array or matrix similarly to the sensing devices. Alternatively, the visual surface changing elements may be embodied as electronic inks or other color changing surfaces.

If used, this visual feedback feature can allow the display of pop-up buttons, characters, and indicators around the touch surface, which can disappear when not in use or required, or glowing special effects that can trace or outline a user's fingers in contact with the touch surface, or otherwise provide visual feedback for the users of the device. In one implementation, the handheld device can be configured to sense one or more touches and provide visual feedback in the area of the touches. In another implementation, the handheld device can be configured to provide visual feedback on the touch surface, detect a touch in the area of the visual feedback, and perform an action that can be associated with the visual feedback. An example of such an arrangement can be found in U.S. application Ser. No. 11/394,493, which is herein incorporated by reference.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A portable electronic device comprising:
   a first input-enabling element comprising a switch, the switch enabling generation of first input signals that activate the device,
   a second input-enabling element enabling generation of second input signals, and
   an input-enabling touch-sensitive display, the touch-sensitive display enabling generation of third input signals when an object touches or is moved across a surface of the touch-sensitive display and fourth input signals when an object applies pressure to the touch-sensitive display, wherein the input-enabling touch-sensitive display comprises a first sensor for generating at least some of the third input signals and a second sensor for generating at least some of the fourth input signals and at least a portion of the first sensor capacitively couples to at least a portion of the second sensor in response to a touch or a press on the input-enabling touch sensitive display.

2. The device of claim 1, wherein the input-enabling touch-sensitive display comprises a flexible membrane.

3. The device of claim 1, wherein the first sensor is disposed on a first side of the input-enabling touch-sensitive display and the second sensor is disposed on a second side of the input-enabling touch-sensitive display.

4. The device of claim 1, wherein:
   the input-enabling touch-sensitive display comprises a first set of sensors for generating at least some of the third input signals and a second set of sensors for generating at least some of the fourth input signals,
   the first set of sensors includes the first sensor and the second set of sensors includes the second sensor,
   the first set of sensors are disposed on a first side of the input-enabling touch-sensitive display,
   the second set of sensors are disposed on a second side of the input-enabling touch-sensitive display, and
   locations of the first set of sensors are aligned with locations of the second set of sensors.

5. The device of claim 1 comprising an input-enabling light-sensitive element, the light-sensitive element generating fifth input signals based on light input to the device.

6. The device of claim 5, wherein the input-enabling light-sensitive element comprises a light sensor.

7. The portable device of claim 1, wherein multiple device functions are selectively enabled by simultaneous receipt of at least two of the first, second, third and fourth input signals.

8. The portable device of claim 1, wherein multiple device functions are selectively enabled by sequential receipt of at least two of the first, second, third and fourth input signals.

9. The portable device of claim 1, wherein the input-enabling touch-sensitive display comprises at least one of a resistive sensor, a pressure sensor, a force sensor, and a capacitive sensor.

10. The portable device of claim 1 comprising an output element that enables audio output in response to receipt of at least one of the first, second, third and fourth input signals.

11. The portable device of claim 1, wherein multiple device functions are selectively enabled by receipt of at least one of the first, second, third and fourth input signals.

12. The portable device of claim 11, wherein at least one of the multiple device functions comprises a scrolling function.

13. The portable device of claim 12, wherein the scrolling function comprises scrolling through a list.

14. The portable device of claim 11, wherein at least one of the multiple device functions is enabled by translational movement of at least one of the input-enabling elements.

15. The portable device of claim 1, wherein at least one of the multiple device functions is selectively enabled by simultaneous receipt of at least two of the first, second, third and fourth input signals.

* * * * *